(12) United States Patent
Im et al.

(10) Patent No.: US 10,852,080 B2
(45) Date of Patent: Dec. 1, 2020

(54) CONTROLLERS, APPARATUSES, AND METHODS FOR THERMAL MANAGEMENT USING ADAPTIVE THERMAL RESISTANCE AND THERMAL CAPACITY

(71) Applicant: Samsung Electronics Co., Ltd., Suwon-si (KR)

(72) Inventors: Yun-hyeok Im, Hwaseong-si (KR); Myung-kyoon Yim, Seoul (KR); Kyoung-min Lee, Yongin-si (KR); Kyung-soo Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 308 days.

(21) Appl. No.: 15/686,574

(22) Filed: Aug. 25, 2017

(65) Prior Publication Data

US 2018/0209750 A1    Jul. 26, 2018

(30) Foreign Application Priority Data

Jan. 26, 2017  (KR) .......................... 10-2017-0012970

(51) Int. Cl.
*F28F 27/00*   (2006.01)
*G05B 15/02*   (2006.01)
(Continued)

(52) U.S. Cl.
CPC .............. *F28F 27/00* (2013.01); *G05B 15/02* (2013.01); *G06F 1/206* (2013.01);
(Continued)

(58) Field of Classification Search
CPC .......... F28F 27/00; G06F 1/206; G05B 15/02; F28F 2013/008; F28F 2200/00; F28F 2250/04
See application file for complete search history.

(56) References Cited

U.S. PATENT DOCUMENTS 3,957,107 A * 5/1976 Altoz ...................... F28D 15/06
                                                    165/276
4,212,346 A * 7/1980 Boyd .................... F25D 19/006
                                                    165/185

(Continued)

FOREIGN PATENT DOCUMENTS

JP    2013-185728 A    9/2013
KR    10-0839962 B1    6/2008
KR    10-1394220 B1    5/2014

OTHER PUBLICATIONS

Velson et al, "Two-Phase Thermal Switch for Spacecraft Passive Thermal Management", Jul. 2015, downloaded from teh internet https://www.1-act.com/wp-content/uploads/2015/07/Thermal-switch-ICES-paper.pdf, pp. 8. (Year: 2015).*

(Continued)

*Primary Examiner* — Rocio Del Mar Perez-Velez
*Assistant Examiner* — Olvin Lopez Alvarez
(74) *Attorney, Agent, or Firm* — Harness, Dickey & Pierce, P.L.C.

(57) ABSTRACT

A controller configured to: acquire a temperature of a first component and a temperature of a second component; and adjust a thermal resistance of a medium between the first component and the second component based on the acquired temperature of the first component, the acquired temperature of the second component, a first temperature limit of the first component, and a second temperature limit of the second component.

16 Claims, 18 Drawing Sheets

(51) Int. Cl.
*G06F 1/20* (2006.01)
*F28F 13/00* (2006.01)
*G06F 1/324* (2019.01)
*G06F 1/3296* (2019.01)

(52) U.S. Cl.
CPC ..... *F28F 2013/008* (2013.01); *F28F 2200/00* (2013.01); *F28F 2250/04* (2013.01); *G06F 1/324* (2013.01); *G06F 1/3296* (2013.01)

(56) References Cited

U.S. PATENT DOCUMENTS

| | | | | |
|---|---|---|---|---|
| 4,281,708 | A * | 8/1981 | Wing | F28F 27/00 165/277 |
| 6,161,388 | A | 12/2000 | Ghoshal | |
| 7,119,434 | B1 | 10/2006 | Ghosh et al. | |
| 7,411,792 | B2 | 8/2008 | Richards et al. | |
| 7,586,281 | B2 | 9/2009 | Cohen et al. | |
| 7,882,888 | B1 * | 2/2011 | Bugby | F28D 1/0477 165/104.14 |
| 7,915,994 | B2 | 3/2011 | Habboosh | |
| 8,602,092 | B2 * | 12/2013 | Lenehan | H01L 23/34 165/247 |
| 8,943,336 | B2 | 1/2015 | Shah et al. | |
| 9,025,333 | B1 | 5/2015 | Spowart et al. | |
| 10,181,433 | B2 * | 1/2019 | Hurbi | H01L 23/3675 |
| 10,429,910 | B1 * | 10/2019 | Imwalle | G06F 1/206 |
| 2004/0004464 | A1 * | 1/2004 | Tsukamoto | H01M 10/44 320/162 |
| 2004/0197947 | A1 * | 10/2004 | Fricke | G11C 13/0004 438/102 |
| 2004/0226695 | A1 * | 11/2004 | Bolle | F28D 15/06 165/104.21 |
| 2008/0210893 | A1 * | 9/2008 | McCarthy | G02B 5/223 250/517.1 |
| 2008/0294222 | A1 * | 11/2008 | Schechter | A61B 18/1445 607/50 |
| 2008/0306704 | A1 * | 12/2008 | Rockenfeller | G01K 3/10 702/132 |
| 2009/0294117 | A1 * | 12/2009 | Hodes | F28D 15/06 165/287 |
| 2010/0065263 | A1 * | 3/2010 | Tanchon | B64G 1/58 165/277 |
| 2010/0100090 | A1 * | 4/2010 | Rose | A61B 18/02 606/22 |
| 2010/0221627 | A1 * | 9/2010 | Nakakubo | F28D 15/0266 429/434 |
| 2012/0247707 | A1 * | 10/2012 | Surdeanu | F21V 29/00 165/10 |
| 2012/0273920 | A1 * | 11/2012 | Fedorov | H01L 23/373 257/532 |
| 2013/0000871 | A1 * | 1/2013 | Olson | G05D 23/01 165/104.26 |
| 2013/0008638 | A1 * | 1/2013 | Quinn | F28F 3/02 165/185 |
| 2013/0148302 | A1 * | 6/2013 | Ben Jamaa | H05K 7/2039 361/704 |
| 2013/0161515 | A1 * | 6/2013 | Park | G01J 5/0862 250/338.1 |
| 2013/0189551 | A1 * | 7/2013 | Imre | H01M 2/1077 429/50 |
| 2013/0314202 | A1 * | 11/2013 | Bolton | F28F 13/00 337/299 |
| 2014/0090808 | A1 * | 4/2014 | Bessho | F28F 3/022 165/104.17 |
| 2014/0134469 | A1 * | 5/2014 | Damon | H01M 2/1077 429/120 |
| 2014/0137570 | A1 * | 5/2014 | Hauck | F25B 21/02 62/3.2 |
| 2014/0153193 | A1 * | 6/2014 | Engelhardt | H05K 1/021 361/720 |
| 2014/0158334 | A1 * | 6/2014 | Dellea | F28D 15/00 165/185 |
| 2014/0268573 | A1 * | 9/2014 | Barnes | G06F 1/203 361/707 |
| 2014/0345846 | A1 * | 11/2014 | Hjort | H05K 7/20209 165/287 |
| 2015/0135732 | A1 * | 5/2015 | Pourrahimi | F25D 17/02 62/51.1 |
| 2015/0135743 | A1 * | 5/2015 | Dobbs | F24F 11/30 62/115 |
| 2015/0139858 | A1 * | 5/2015 | Pedrazzi | A61L 2/07 422/109 |
| 2015/0233564 | A1 * | 8/2015 | Arik | F21V 29/52 362/363 |
| 2015/0289850 | A1 * | 10/2015 | Lewis | A61B 8/4281 600/459 |
| 2015/0350407 | A1 | 12/2015 | Hsu et al. | |
| 2016/0179147 | A1 | 6/2016 | Burr et al. | |
| 2016/0233145 | A1 * | 8/2016 | Caroff | H01L 23/38 |
| 2016/0243000 | A1 * | 8/2016 | Gray | F25D 11/006 |
| 2016/0263619 | A1 * | 9/2016 | Wang | B05D 3/067 |
| 2017/0027084 | A1 * | 1/2017 | Kabbani | H05K 7/20509 |
| 2017/0177045 | A1 * | 6/2017 | Seo | G06F 1/206 |
| 2017/0285699 | A1 * | 10/2017 | Ahuja | G06F 1/206 |
| 2017/0301579 | A1 * | 10/2017 | Hosaka | H01L 21/31116 |
| 2017/0303433 | A1 * | 10/2017 | Delano | H04B 1/3827 |
| 2017/0371719 | A1 * | 12/2017 | Majumdar | G06F 9/5094 |
| 2018/0051946 | A1 * | 2/2018 | Stambaugh, Sr. | F28D 15/00 |
| 2018/0095481 | A1 * | 4/2018 | Swint | G05D 23/01 |
| 2018/0120912 | A1 * | 5/2018 | Jenkins | H01L 23/4275 |
| 2018/0252402 | A1 * | 9/2018 | Parameshwara | F21V 29/503 |
| 2019/0041344 | A1 * | 2/2019 | Lutz | F25B 21/02 |

OTHER PUBLICATIONS

Jeong et al, "Development of a Thermal Switch Using the Channel Geometry Effect for Electronic Packages", Mar. 2009, downloaded from the internet https://ieeexplore.ieee.org/stamp/stamp.jsp?tp=&arnumber=4745816, pp. 100-105. (Year: 2009).*

* cited by examiner

CONTROLLERS, APPARATUSES, AND METHODS FOR THERMAL MANAGEMENT USING ADAPTIVE THERMAL RESISTANCE AND THERMAL CAPACITY

CROSS-REFERENCE TO RELATED APPLICATION

This application claims the benefit of Korean Patent Application No. 10-2017-0012970, filed on Jan. 26, 2017, in the Korean Intellectual Property Office, the disclosure of which is incorporated herein in its entirety by reference.

BACKGROUND

Some example embodiments relate to thermal management, and more particularly, to thermal management apparatuses and/or methods using an adaptive thermal resistance and/or thermal capacity.

An apparatus including a heat-emitting component may have at least one temperature limit. For example, the apparatus may have a temperature limit for normal operation of components included in the apparatus or may have a temperature limit determined based on an environment in which the apparatus is used. When a temperature of the apparatus or a component included therein reaches a temperature limit thereof, hindering or preventing an additional temperature increase may be desirable. For example, an operation of at least one component included in the apparatus may be stopped or restricted. Thermal management in the apparatus may be related to the performance of the apparatus.

SUMMARY

Some example embodiments relate to thermal management and provide apparatuses having a variable thermal resistance and/or thermal capacity and thermal management methods performed by the apparatuses.

According to some example embodiments, there is provided a controller configured to: acquire a temperature of a first component and a temperature of a second component. The controller is further configured to adjust a thermal resistance of a medium between the first component and the second component based on the acquired temperature of the first component, the acquired temperature of the second component, a first temperature limit of the first component, and a second temperature limit of the second component.

According to some example embodiments, there is provided an apparatus including: a first component having a first temperature limit. The apparatus further includes a second component having a second temperature limit. Furthermore, the apparatus includes a first medium between the first component and the second component and having a first thermal resistance, the first thermal resistance of the first medium being adjustable. The thermal resistance of the first medium is adjusted to decrease a difference between a first point in time when a temperature of the first component reaches the first temperature limit and a second point in time when a temperature of the second component reaches the second temperature limit.

According to some example embodiments, there is provided a controller configured to: acquire a temperature of a first component and a temperature of a second component, the second component being thermally coupled to the first component and having a variable thermal capacity. Furthermore, the controller is configured to adjust the thermal capacity of the second component based on the acquired temperature of the first component, the acquired temperature of the second component, a first temperature limit of the first component, and a second temperature limit of the second component.

According to some example embodiments, there is provided an apparatus including: a first component having a first temperature limit. Furthermore, the apparatus includes a second component thermally coupled to the first component, the second component having a second temperature limit and a variable thermal capacity. The thermal capacity of the second component is adjusted to decrease a difference between a first point in time when a temperature of the first component reaches the first temperature limit and a second point in time when a temperature of the second component reaches the second temperature limit.

According to some example embodiments, there is provided an apparatus including a first component having a first temperature limit. The apparatus further includes a second component having a second temperature limit. The apparatus further includes a first medium between the first component and the second component, at least one of a thermal resistance of the first medium and a thermal capacity of the second component being adjustable. Furthermore, the apparatus includes a controller configured to estimate at least one of a temperature increase rate of the first component, a thermal margin of the first component and a thermal margin of the second component. The controller is further configured to adjust the at least one of the thermal resistance of the first medium and the thermal capacity of the second component based on the estimated at least one of the temperature increase rate of the first component, the thermal margin of the first component and the thermal margin of the second component.

BRIEF DESCRIPTION OF THE DRAWINGS

Some example embodiments will be more clearly understood from the following detailed description taken in conjunction with the accompanying drawings in which.

DETAILED DESCRIPTION

Figure 1:
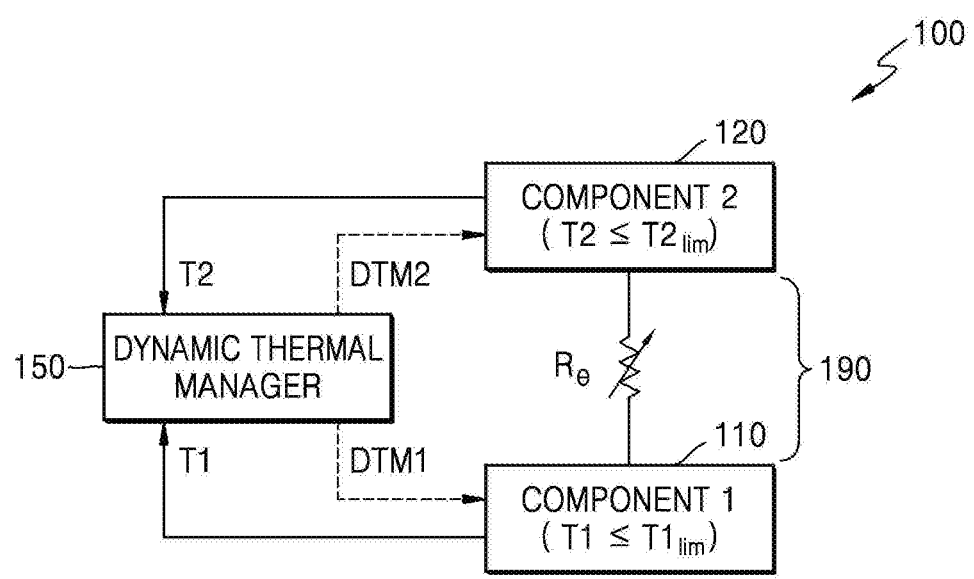
FIG. 1 is a block diagram of an apparatus including a medium having an adjustable thermal resistance, according to some example embodiments.

FIG. 1 is a block diagram of an apparatus 100 including a dynamic thermal manager 150, according to some example embodiments. As shown in FIG. 1, the apparatus 100 may include a first component 110, a second component 120, a dynamic thermal manager 150, and a medium 190 between the first and second components 110 and 120.

The first component 110 and/or the second component 120 of the apparatus 100 may be heat-emitting components. For example, the apparatus 100 may be an electronic device such as a computing system, a memory system, a communication system, or a network system, or may be a mechanical device, e.g., a motor, an internal combustion engine, etc., which includes a component providing power. Also, as described below with reference to FIG. 23B, the apparatus 100 may be a semiconductor package including multiple functional blocks.

As illustrated in FIG. 1, the first and second components 110 and 120 included in the apparatus 100 may respectively have temperature limits. For example, the first component 110 may have a first temperature limit $T1_{lim}$, and a first temperature T1 of the first component 110 may be maintained to be less than or equal to the first temperature limit $T1_{lim}$. Similarly, the second component 120 may have a second temperature limit $T2_{lim}$, and a second temperature T2 of the second component 120 may be maintained to be less than or equal to the second temperature limit $T2_{lim}$. A temperature limit of a component may correspond to a temperature at which the component or the apparatus 100 normally operates or to an upper temperature limit to ensure a safe operation of the apparatus 100 in an environment in which the component or the apparatus 100 is used, such as with regard to another apparatus adjacent to the apparatus 100 or a user of the apparatus 100.

The dynamic thermal manager 150 may acquire the first and second temperatures T1 and T2 from the first and second components 110 and 120, respectively. For example, the dynamic thermal manager 150 may receive signals regarding the first and second temperatures T1 and T2 from temperature sensors respectively arranged in the first and second components 110 and 120 or may estimate the first and second temperatures T1 and T2 based on various factors (e.g., an operation duration, supplied energy, etc.) affecting the first and second temperatures T1 and T2 of the first and second components 110 and 120, respectively.

The dynamic thermal manager 150 may store the first and second temperature limits $T1_{lim}$ and $T2_{lim}$, and when the first temperature T1 reaches the first temperature limit $T1_{lim}$ or when the second temperature T2 reaches the second temperature limit $T2_{lim}$, the dynamic thermal manager 150 may control operations of the first component 110 and/or the second component 120. For example, when the first temperature T1 reaches or is close to the first temperature limit $T1_{lim}$, the dynamic thermal manager 150 may generate a first operation control signal DTM1 for stopping or restricting the operation of the first component 110. Similarly, when the second temperature T2 reaches or is close to the second temperature limit $T2_{lim}$, the dynamic thermal manager 150 may generate a second operation control signal DTM2 for stopping or restricting the operation of the second component 120. According to some example embodiments, when the first component 110 is a processor, the dynamic thermal manager 150 may adjust an amplitude of a power voltage applied to the processor or a frequency of a clock signal according to the first operation control signal DTM1. The dynamic thermal manager 150 may include a memory configured to store a series of instructions and a processor configured to execute the instructions, or may include a hardware module designed through logic synthesis, etc. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor, a multiprocessor, an application-specific integrated circuit (ASIC), and a field programmable gate array (FPGA). Operations described herein as being performed by the dynamic thermal manager 150 may be performed by at least one processor executing program code that includes instructions stored in a memory corresponding to the operations.

In some example embodiments, when the first component 110 is a heat-emitting component and the second component is a non-heat-emitting component, the dynamic thermal manager 150 may generate only the first operation control signal DTM1 in order to control the first and second temperatures T1 and T2. In some example embodiments, when the temperatures of the first and second components 110 and 120, respectively, vary due to other components that are not illustrated in FIG. 1, the dynamic thermal manager 150 may generate operation control signals for controlling operations of the other components.

Figure 4A:
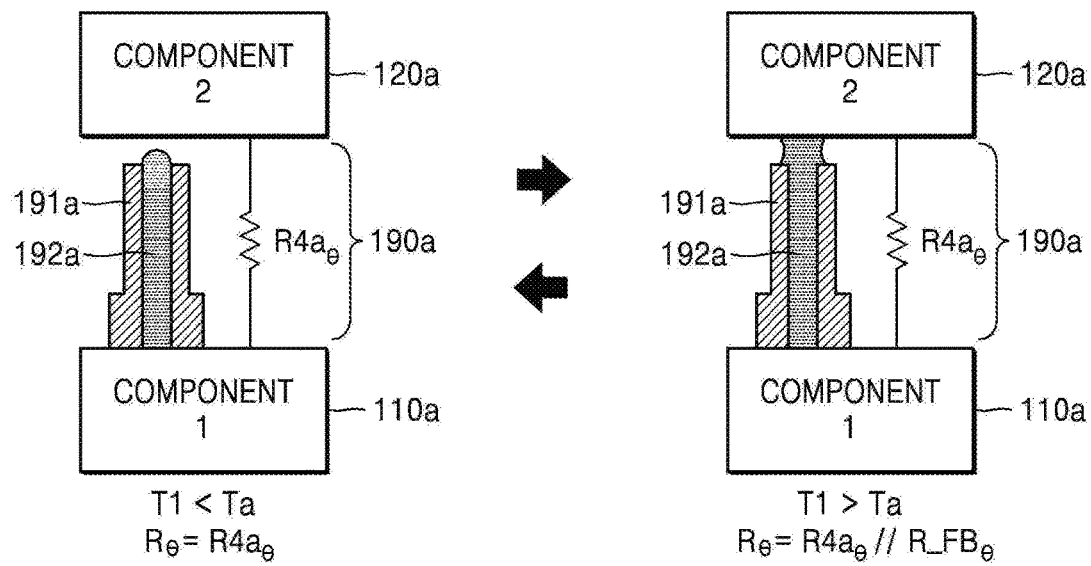
FIGS. 4A and 4B illustrate examples of a medium of FIG. 1, according to some example embodiments.
Figure 4B:
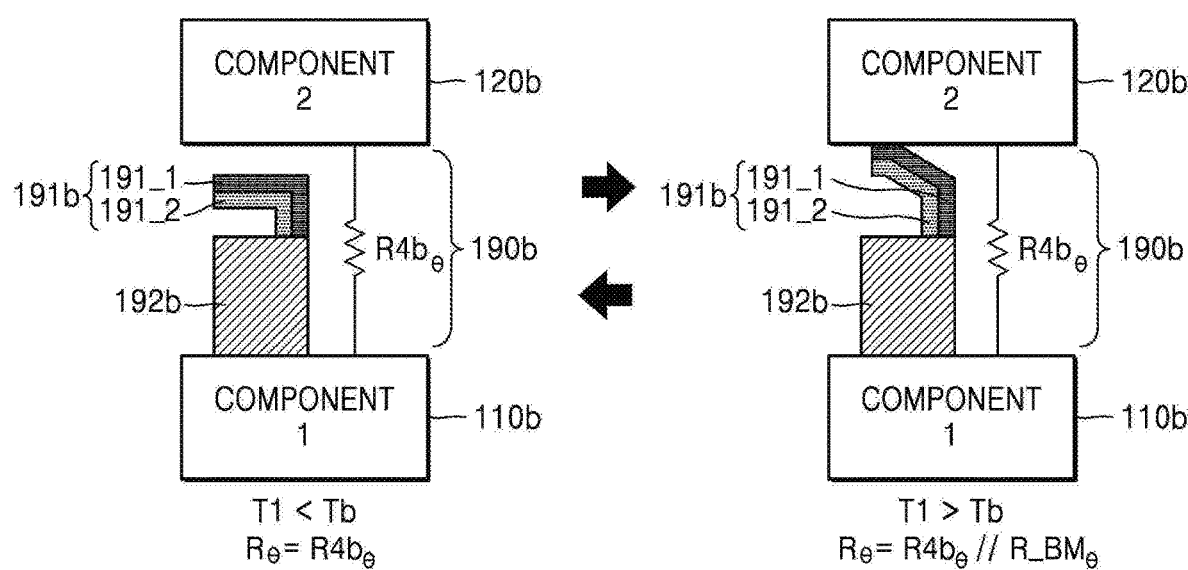
Figure 7:
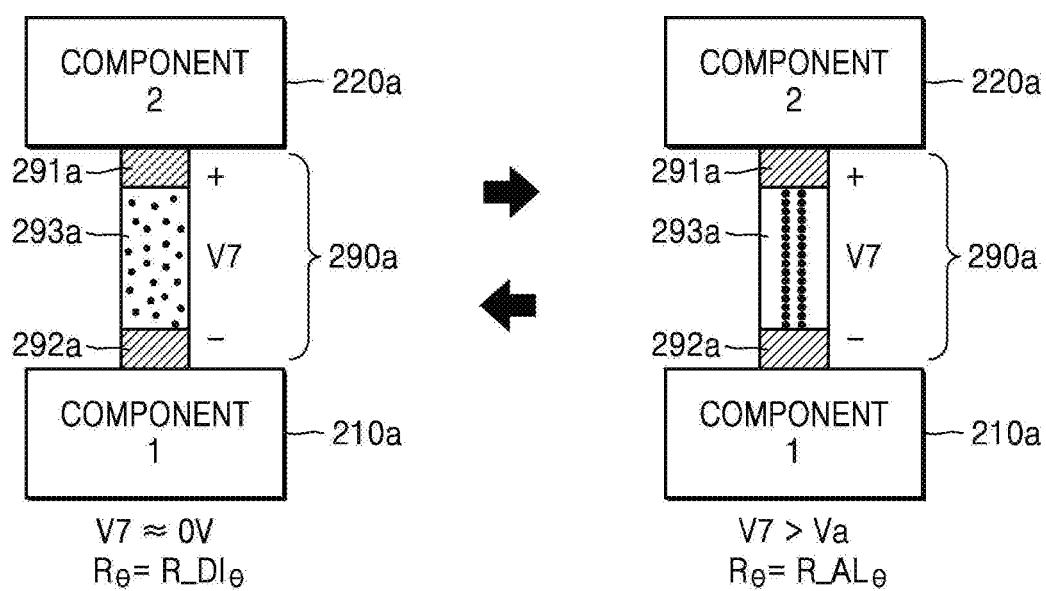
FIG. 7 illustrates an example of a medium of FIG. 5, according to some example embodiments.

The medium 190 between the first and second components 110 and 120 may have a variable thermal resistance $R_\theta$. For example, as illustrated in FIGS. 4A and 4B, the thermal resistance $R_\theta$ of the medium 190 may vary with physical characteristics that change according to an ambient temperature, or as illustrated in FIG. 7, the thermal resistance $R_\theta$ of the medium 190 may be controlled by a controller (e.g., a controller 270 of FIG. 5). Some example embodiments are not limited to the above examples regarding the medium 190.

The first and second components 110 and 120 may be thermally coupled to each other through the medium 190. Accordingly, the first temperature T1 may be affected by the second temperature T2 and also the second temperature T2 may be affected by the first temperature T1. Degrees of such influences may change depending on the thermal resistance $R_\theta$ of the medium 190. For example, when the thermal resistance $R_\theta$ of the medium 190 is relatively great (that is, when the thermal conductivity of the medium 190 is low), a difference between the first and second temperatures T1 and T2 may be reduced at a relatively slow pace. When the thermal resistance $R_\theta$ of the medium 190 is relatively low (that is, when the thermal conductivity of the medium 190 is high), the difference between the first and second temperatures T1 and T2 may be reduced at a relatively fast pace.

As described below with reference to the drawings, in some example embodiments, as the thermal resistance $R_\theta$ of the medium 190 varies, points in time when the first and second temperatures T1 and T2 of the first and second components 110 and 120 respectively reach the first and second temperature limits $T1_{lim}$ and $T2_{lim}$ may be delayed. For example, as described with reference to FIGS. 2A and 2B, to decrease a difference between a first point in time when the first temperature T1 reaches the first temperature limit $T1_{lim}$ and a second point in time when the second temperature T2 reaches the second temperature limit $T2_{lim}$, or to delay the earlier one of the first and second points, the thermal resistance $R_\theta$ of the medium 190 may be adjusted. Accordingly, a duration in which the first and second components 110 and 120 operate at temperatures lower than or equal to the first and second temperature limits $T1_{lim}$ and $T2_{lim}$ may be extended. Thus, the performance of the apparatus 100 may be improved. Also, an additional component for thermal management, e.g., a heat dissipation component, may not be included, and thus, manufacturing costs of the apparatus 100 may be reduced, and the apparatus 100 may be reduced in size.

Figure 2A:
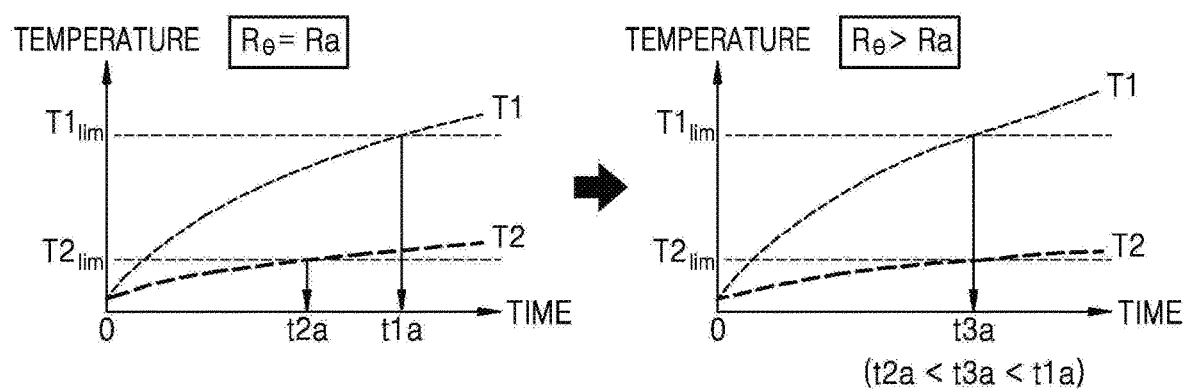
FIGS. 2A and 2B are graphs illustrating thermal changes of first and second components of FIG. 1, according to some example embodiments.
Figure 2B:
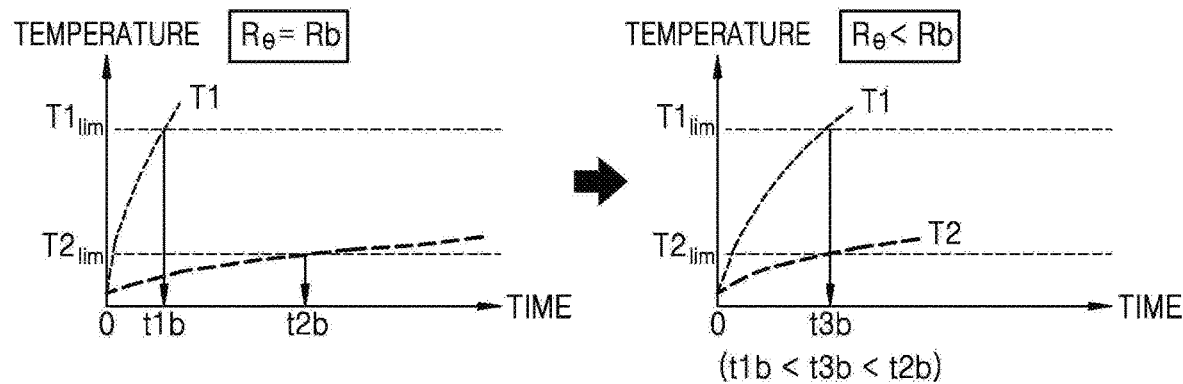

FIGS. 2A and 2B are graphs illustrating thermal changes of the first and second components 110 and 120 of FIG. 1, according to some example embodiments. In particular, the graphs on the left sides of FIGS. 2A and 2B illustrate the thermal changes of the first and second components 110 and 120 when the thermal resistance $R_\theta$ of the medium 190 of FIG. 1 is fixed. The graphs on the right sides of FIGS. 2A and 2B illustrate the thermal changes of the first and second components 110 and 120 when the thermal resistance $R_\theta$ of the medium 190 of FIG. 1 increases or decreases. Referring to FIGS. 2A and 2B, it is assumed that the first component 110 is a heat-emitting component and the first temperature limit $T1_{lim}$ is greater than the second temperature limit $T2_{lim}$. Hereinafter, the graphs of FIGS. 2A and 2B are described with reference to FIG. 1.

Referring to FIG. 2A, when the apparatus 100 operates according to a first scenario, the first component 110 may keep generating a certain amount of heat in a relatively long time period. For example, in the first scenario the first component 110 may be a processor that reproduces a video desired by the user of the apparatus 100. Also, in the first scenario the first component 110 may be a battery charged by a charger disposed outside the apparatus 100.

Referring to the graph on the left side of FIG. 2A, according to the first scenario, a second point in time t2a when the second temperature T2 reaches the second temperature limit $T2_{lim}$ may be ahead of a first point in time t1a when the first temperature T1 reaches the first temperature limit $T1_{lim}$. That is, when the thermal resistance $R_\theta$ of the medium 190 has a fixed value Ra, the dynamic thermal manager 150 may generate the first operation control signal DTM1 for restricting the operation of the first component 110 at the second point in time t2a or at a point in time that is ahead of the second point in time t2a. Although the first temperature T1 is lower than the first temperature limit $T1_{lim}$ at the second point in time t2a, e.g., the first component 110 has a temperature margin at the second point in time t2a, the operation of the first component 110 may be restricted at the second point in time t2a.

Referring to the graph on the right side of FIG. 2A, when the thermal resistance $R_\theta$ of the medium 190 is adjusted to be greater than the value Ra on the graph on the left side, a point in time when the dynamic thermal manager 150 restricts the operation of the first component 110 according to the first scenario may be delayed. That is, due to the increased thermal resistance $R_\theta$ of the medium 190 (or decreased thermal conductivity), a lesser amount heat generated by the first component 110 may be transferred to the second component 120 in comparison with a case where the thermal resistance $R_\theta$ of the medium 190 has a fixed value Ra. Accordingly, as illustrated on the graph on the right side of FIG. 2A, the first temperature T1 of the first component 110 may increase quicker than the second temperature T2 of the second component 120. A point in time when the first temperature T1 reaches the first temperature limit $T1_{lim}$ may be ahead of the first point in time t1a, but may be after the second point in time t2a when the second temperature T2 reaches the second temperature limit $T2_{lim}$. As a result, the point in time when the dynamic thermal manager 150 restricts the operation of the first component 110 may be delayed.

When the thermal resistance $R_\theta$ of the medium 190 has an appropriate value greater than the value Ra, as illustrated on the graph on the right side of FIG. 2A, the first point in time when the first temperature T1 reaches the first temperature limit $T1_{lim}$ and the second point in time when the second temperature T2 reaches the second temperature limit $T2_{lim}$ may be similar to or the same as each other as a point in time t3a. The point in time t3a when the first point in time is similar to or the same as the second point in time may be an end point of the longest duration during which the first component 110 may operate without any restriction from the dynamic thermal manager 150 according to the first scenario.

Referring to FIG. 2B, when the apparatus 100 operates according to a second scenario, the first component 110 may generate a relatively large amount of heat in a relatively short time period. For example, in the second scenario the first component 110 may be a processor that executes a program that involves a large amount of computations in a short period like a web browser triggered by the user of the apparatus 100.

Referring to the graph on the left side of FIG. 2B, according to the second scenario, a first point in time t1$b$ when the first temperature T1 reaches the first temperature limit T1$_{lim}$ may be ahead of a second point in time t2$b$ when the second temperature T2 reaches the second temperature limit T2$_{lim}$. That is, when the thermal resistance R$_\theta$ of the medium 190 has a fixed value Rb, the dynamic thermal manager 150 may generate the first operation control signal DTM1 for restricting the operation of the first component 110 at the first point in time t1$b$ or a point in time that is ahead of the first point in time t1$b$. Although the second temperature T2 is lower than the second temperature limit T2$_{lim}$ at the first point in time t1$b$, that is, although the second component 120 has a temperature margin at the first point in time t1$b$, the operation of the first component 110 may be restricted at the first point in time t1$b$.

Referring to the graph on the right side of FIG. 2B, when the thermal resistance R$_\theta$ of the medium 190 is adjusted to have a value smaller than the value Rb on the graph on the left side of FIG. 2B, a point in time when the dynamic thermal manager 150 restricts the operation of the first component 110 according to the second scenario may be delayed. That is, due to decreased thermal resistance R$_\theta$ of the medium 190 (or increased thermal conductivity), the heat generated by the first component 110 may be well transferred to the second component 120 in comparison with a case where the thermal resistance R$_\theta$ of the medium 190 has the value Rb. Accordingly, as illustrated on the graph on the right side of FIG. 2B, the first temperature T1 of the first component 110 may increase slower than the second temperature T2 of the second component 120. A point in time when the first temperature T1 reaches the first temperature limit T1$_{lim}$ may be after the first point in time t1$b$, and a point in time when the second temperature T2 reaches the second temperature limit T2$_{lim}$ may be ahead of the second point in time t2$b$. As a result, the point in time when the dynamic thermal manager 150 restricts the operation of the first component 110 may be delayed.

When the thermal resistance R$_\theta$ of the medium 190 has an appropriate value smaller than the value Rb, as illustrated on the graph on the right side of FIG. 2B, the first point in time when the first temperature T1 reaches the first temperature limit T1$_{lim}$ and the second point in time when the second temperature T2 reaches the second temperature limit T2$_{lim}$ may be similar to or the same as each other as a point in time t3$b$. The point in time t3$b$ when the first point in time is similar to or the same as the second point in time may be an end point of the longest duration during which the first component 110 may operate without restriction from the dynamic thermal manager 150 according to the second scenario.

As described with reference to FIGS. 2A and 2B, as the thermal resistance R$_\theta$ of the medium 190, which is between the first and second components 110 and 120, is adjusted, a duration during which the first component 110 operates without any restriction from the dynamic thermal manager 150 may expand. To this end, the thermal resistance R$_\theta$ of the medium 190 may be adjusted to delay the earlier one of the first point in time when the first temperature T1 reaches the first temperature limit T1$_{lim}$ and the second point in time when the second temperature T2 reaches the second temperature limit T2$_{lim}$. In other words, the thermal resistance R$_\theta$ of the medium 190 may be adjusted to decrease a difference between the first and second points in time.

Figure 3:
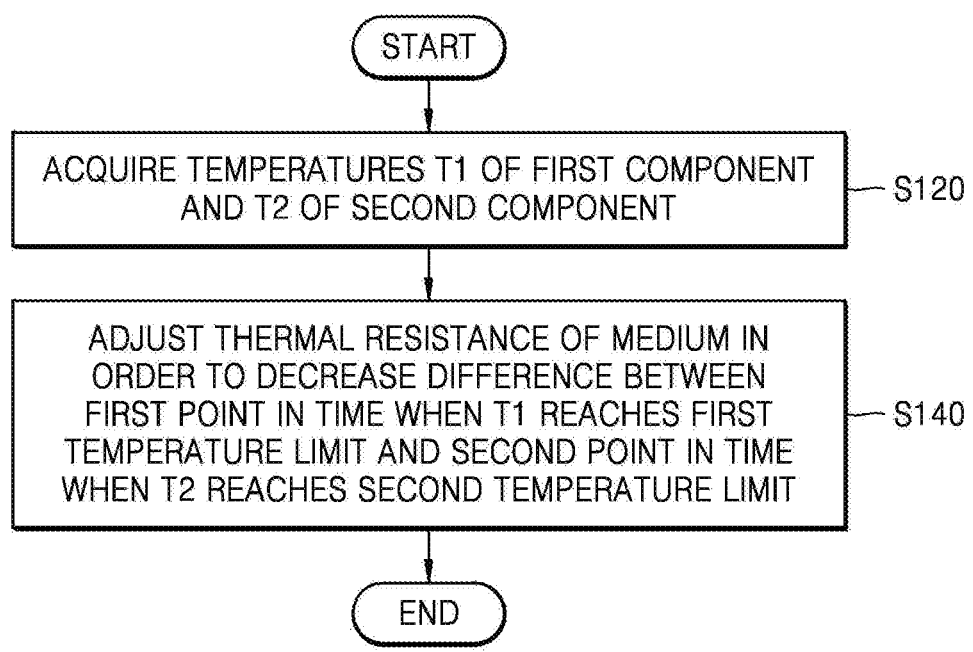
FIG. 3 is a flowchart of thermal management methods using a medium having an adjustable thermal resistance, according to some example embodiments.

FIG. 3 is a flowchart of thermal management methods using a medium having an adjustable thermal resistance, according to some example embodiments. For example, the thermal management methods of FIG. 3 may be performed by the apparatus 100 of FIG. 1. Hereinafter, the thermal management methods of FIG. 3 will be described with reference to FIG. 1.

Referring to FIG. 3, in operation S120, the first and second temperatures T1 and T2 of the first and second components 110 and 120, respectively, may be acquired. For example, the first and second temperatures T1 and T2 of the first and second components 110 and 120, respectively, may be acquired by signals from a temperature sensor, may be estimated based on the operations of the first and second components 110 and 120, or may be directly transferred to the medium 190 that is thermally coupled to the first and second components 110 and 120.

In operation S140, the thermal resistance R$_\theta$ of the medium 190 may be adjusted to decrease the difference between a first point in time when the first temperature T1 reaches a first temperature limit T1$_{lim}$ and a second point in time when the second temperature T2 reaches a second temperature limit T2$_{lim}$. For example, as illustrated in FIGS. 4A and 4B, the medium 190 may include at least one thermal switch reacting to the first temperature T1 and/or the second temperature T2, and according to whether the thermal switch is on or off, the thermal resistance R$_\theta$ of the medium 190 may be adjusted. In addition, as illustrated in FIG. 7, the medium 190 may include a material having thermal resistance R$_\theta$ that changes according to external stimuli, and the thermal resistance R$_\theta$ of the medium 190 may be adjusted according to external control. As illustrated in FIGS. 2A and 2B, when the first component 110 is a heat-emitting component, the thermal resistance R$_\theta$ of the medium 190 may decrease if a temperature increase rate of the first component 110 is high, and may increase if the temperature increase rate is low.

FIGS. 4A and 4B illustrate examples of the medium 190 of FIG. 1, according to some example embodiments. In particular, FIGS. 4A and 4B are cross-sectional views of media. 190$a$ and 190$b$, respectively, including thermal switches that operate according to a first temperature T1 of a first component 110$a$. Although FIGS. 4A and 4B illustrate that each of the media 190$a$ and 190$b$ include one thermal switch for convenience, the media 190$a$ and 190$b$ may each include at least two thermal switches.

Referring to FIG. 4A, the medium 190$a$ between the first component 110$a$ and a second component 120$a$ may include, as the thermal switch, a fluid 192$a$ having thermal conductivity and thermally coupled to the first component 110$a$. The fluid 192$a$ may be within a support 191$a$, and the support 191$a$ may be a material, e.g., a metallic material, which has high thermal conductivity. The fluid 192$a$ may expand or contract within a fluctuation range of the first temperature T1 of the first component 110$a$ and thus may be thermally coupled to or separated from the second component 120$a$. That is, according to the first temperature T1, a shape of the fluid 192$a$ may be switched among a shape on the left side of FIG. 4A and a shape on the right side of FIG. 4A. As illustrated in FIG. 4A, the thermal switch using thermal expansion characteristics of a fluid may be referred to as a fluid bridge.

Referring to the left side of FIG. 4A, when the first temperature T1 is lower than a temperature Ta, the fluid 192$a$ may not expand and may be thermally separated from the second component 120$a$. Accordingly, the thermal resistance R$_\theta$ of the medium 190$a$ between the first component 110a and the second component 120a may be equal to a thermal resistance $R4a_\theta$ of the medium 190a in a state in which the fluid 192a is thermally separated from the second component 120a.

On the other hand, referring to the right side of FIG. 4A, when the first temperature T1 is higher than a temperature Ta, the fluid 192a may expand and may be thermally coupled to the second component 120a. Accordingly, the thermal resistance $R_\theta$ of the medium 190a between the first component 110a and the second component 120a may be considered as being equal to a value $(R4a_\theta \| R\_FB_\theta)$ that is obtained when the fluid 192a is connected to the second component 120a, wherein the thermal resistance $R4a_\theta$ is obtained when the fluid 192a is thermally separated from the second component 120a and the fluid 192a has a thermal resistance $R\_FB_\theta$ when the fluid 192a is thermally coupled to the first and second components 110 and 120. As a result, in comparison with a case where the first temperature T1 is the temperature Ta, the thermal resistance $R_\theta$ of the medium 190a may decrease.

Referring to FIG. 4B, the medium 190b between a first component 110b and a second component 120b may include a bimetal 191b that has thermal conductivity and is thermally coupled to the first component 110b. As illustrated in FIG. 4B, the bimetal 191b may include a metal 191_1 having a relatively small thermal expansion coefficient and a metal 191_2 having a relatively great thermal expansion coefficient. The bimetal 191b may be coupled to a support 192b having high thermal conductivity and may be thermally coupled to the first component 110b through the support 192b. In some example embodiments, unlike the illustration of FIG. 4B, the bimetal 191b may be directly thermally coupled to the first component 110b without the support 192b. As the bimetal 191b is unfolded or bent within a fluctuation range of a first temperature T1 of the first component 110b, the bimetal 191b may be thermally coupled to or separated from the second component 120b. That is, according to the first temperature T, a shape of the bimetal 191b may be switched among a shape on the left side of FIG. 4B and a shape on the right side of FIG. 4B.

Referring to the left side of FIG. 4B, when the first temperature T1 is lower than a temperature Tb, the bimetal 191b may remain bent and may be thermally separated from the second component 120b. Accordingly, thermal resistance $R_\theta$ of the medium 190b between the first component 110b and the second component 120b may be equal to thermal resistance $R4b_\theta$ in a state in which the bimetal 191b is thermally separated from the second component 120b.

On the other hand, referring to the right side of FIG. 4B, when the first temperature T1 is higher than the temperature Tb, the bimetal 191b may be unfolded and may be thermally coupled to the second component 120b. Accordingly, the thermal resistance $R_\theta$ of the medium 190b between the first component 110b and the second component 120b may be considered as being equal to a value $(R4b_\theta \| R\_BM_\theta)$ that is obtained when the bimetal 191b is connected to the second component 120b, wherein the thermal resistance $R4b_\theta$ is obtained when the bimetal 191b is thermally separated from the second component 120b and the bimetal 191b has a thermal resistance $R\_BM_\theta$ when the bimetal 191b is thermally coupled to the second component 120b. As a result, in comparison with a case where the first temperature T1 is the temperature Tb, the thermal resistance $R_\theta$ of the medium 190b may decrease.

Figure 5:
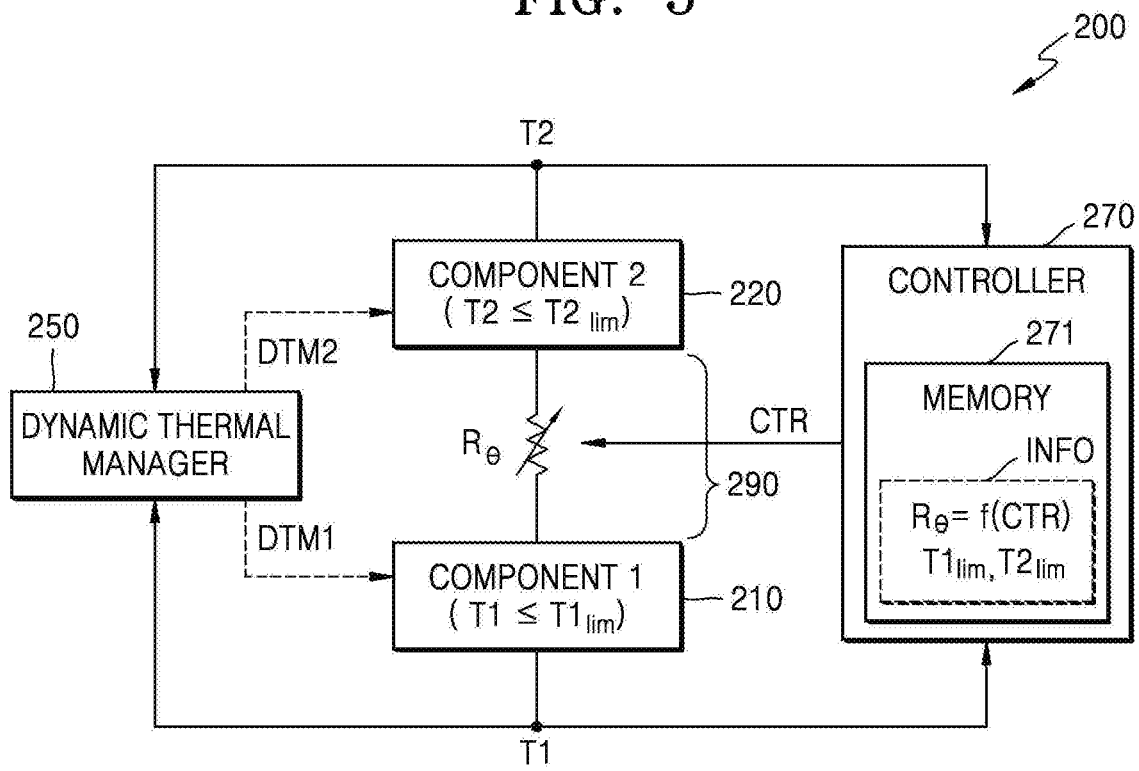
FIG. 5 is a block diagram of an apparatus including a controller in communication with a medium having an adjustable thermal resistance, according to some example embodiments.

FIG. 5 is a block diagram of an apparatus 200 including a controller in communication with a medium having an adjustable thermal resistance, according to some example embodiments. As illustrated in FIG. 5, the apparatus 200 may include a first component 210, a second component 220, a dynamic thermal manager 250, and a controller 270. Compared with the apparatus 100 of FIG. 1, the apparatus 200 of FIG. 5 may further include the controller 270 that adjusts thermal resistance $R_\theta$ of a medium 290, and the medium 290 may receive a control signal CTR from the controller 270. The first component 210, the second component 220, and the dynamic thermal manager 250 of FIG. 5 may be similar to or the same as the first and second components 110 and 120, respectively, and the dynamic thermal manager 150 of FIG. 1. The first component 210, the second component 220, and the dynamic thermal manager 250 of FIG. 5 may perform functions including the same functions as or similar functions to those of the first and second components 110 and 120, respectively, and the dynamic thermal manager 150 of FIG. 1. The descriptions that are already provided with reference to FIG. 1 will not be repeated.

The controller 270 may control the medium 290 that provides variable thermal resistance $R_\theta$ between the first component 210 and the second component 220. As illustrated in FIG. 5, the controller 270 may acquire a first temperature T1 of the first component 210 and a second temperature T2 of the second component 220 and may transmit the control signal CTR to the medium 290. Based on the first and second temperatures T1 and T2 and first and second temperature limits $T1_{lim}$ and $T2_{lim}$, the controller 270 may adjust the thermal resistance $R_\theta$ of the medium 290 by using the control signal CTR. For example, similar to the descriptions provided with reference to FIGS. 2A and 2B, the controller 270 may adjust the thermal resistance $R_\theta$ of the medium 290 by using the control signal CTR in such a manner that an earlier one of a first point in time when the first temperature T1 of the first component 210 reaches the first temperature limit $T1_{lim}$ and a second point in time when the second temperature T2 of the second component 220 reaches the second temperature limit $T2_{lim}$ is to be delayed. In some example embodiments, the controller 270 may include a software module including instructions and a processor for executing the instructions or may include a hardware module designed through logic synthesis, etc. Operations described herein as being performed by the controller 270 may be performed by at least one processor executing program code that includes instructions stored in a memory corresponding to the operations.

The controller 270 may include a memory 271, and the memory 271 may store information INFO used to adjust the thermal resistance $R_\theta$ of the medium 290. For example, as illustrated in FIG. 5, the information INFO stored in the memory 271 may include the first and second temperature limits $T1_{lim}$ and $T2_{lim}$ and information $R_\theta = f(CTR)$ regarding a relationship between the control signal CTR and the thermal resistance $R_\theta$ as thermal resistance characteristics of the medium 290. The controller 270 may generate the control signal CTR by referring to the information INFO stored in the memory 271, based on the first and second temperatures T1 and T2. In some example embodiments, unlike the example of FIG. 5, the controller 270 may be included in the dynamic thermal manager 250.

The medium 290 may have the thermal resistance $R_\theta$ that is adjusted based on the control signal CTR from the controller 270. For example, the thermal resistance $R_\theta$ of the medium 290 may change in reaction to stimuli generated based on the control signal CTR, e.g., to an electric field as illustrated in FIG. 7.

Figure 6:
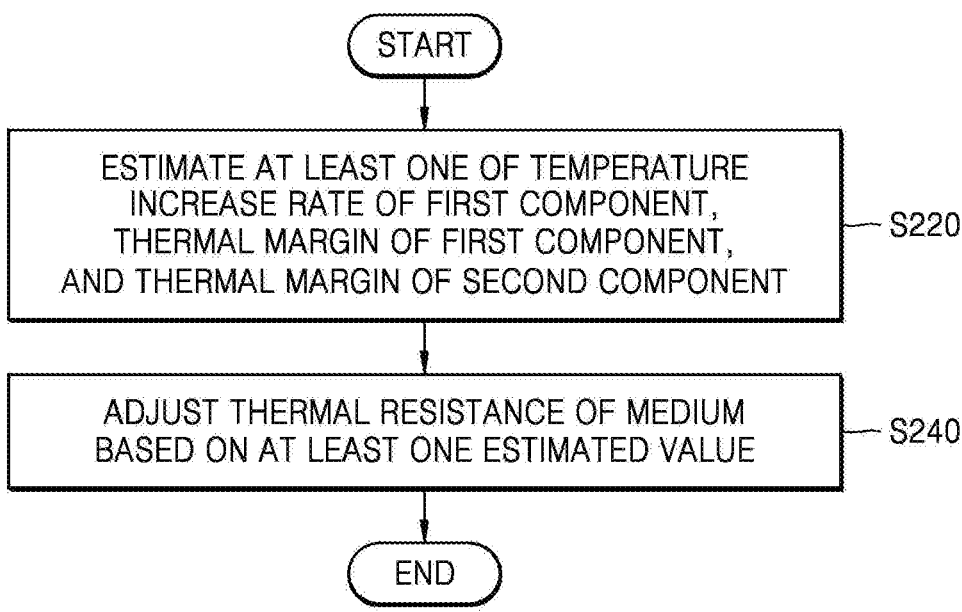
FIG. 6 is a flowchart of thermal management methods using a controller in communication with a medium having an adjustable thermal resistance, according to some example embodiments.

FIG. 6 is a flowchart of thermal management methods using a controller in communication with a medium having an adjustable thermal resistance, according to some example embodiments. For example, the thermal management methods of FIG. 6 may be performed by the controller 270 of FIG. 5. In FIG. 6, it is assumed that the first component 210 of FIG. 5 is a heat-emitting component. The thermal management methods of FIG. 6 will be described with reference to FIG. 5.

Referring to FIG. 6, in operation S220, at least one of a temperature increase rate $T1_{slope}$ of the first component 210, a thermal margin TM1 of the first component 210, and a thermal margin TM2 of the second component 220 is estimated. The thermal margin TM1 of the first component 210 and the thermal margin TM2 of the second component 220 may respectively correspond to a difference between the first temperature T1 and the first temperature limit $T1_{lim}$ and a difference between the second temperature T2 and the second temperature limit $T2_{lim}$, or may correspond to an amount of heat that the first component 210 and the second component 220 may store until the first component 210 and the second component 220 respectively reach the first temperature limit $T1_{lim}$ and the second temperature limit $T2_{lim}$. Similarly the descriptions provided with reference to FIGS. 2A and 2B, depending on whether the first temperature T1 of the first component 210 gradually or sharply increases, an increase or decrease of the thermal resistance $R_\theta$ of the medium 290 may be determined. To this end, the controller 270 may estimate the temperature increase rate $T1_{slope}$ of the first component 210, which is a heat-emitting component. In addition, depending on the thermal margin TM1 of the first component 210 and/or the thermal margin TM2 of the second component 220, an increase or decrease of the thermal resistance $R_\theta$ of the medium 290 may be determined.

The controller 270 may calculate the temperature increase rate $T1_{slope}$ by measuring a change in the first temperature T1 of the first component 210 or based on an amount of energy consumed by the first component 210. Also, the estimated temperature increase rate $T1_{slope}$ may correspond to an increase rate of the first temperature T1 from the past to the present or a rate of the first temperature T1 which is expected to increase in the future. For example, the temperature increase rate $T1_{slope}$ of the first temperature T1 may be estimated based on power consumed by the first component 210. The power consumed by the first component 210 may be calculated by measuring a current and/or a voltage, or when the first component 210 includes a processor for executing instructions, the power consumed by the first component 210 may be calculated based on levels of loads acting on the processor.

Also, the controller 270 may calculate the thermal margin TM1 of the first component 210 and the thermal margin TM2 of the second component 220 based on the first temperature T1 and the first temperature limit $T1_{lim}$ of the first component 210 and the second temperature T2 and the second temperature limit $T2_{lim}$ of the second component 220. For example, the controller 270 may calculate the thermal margin TM1 of the first component 210 based on the difference between the first temperature T1 and the first temperature limit $T1_{lim}$ or based on a thermal capacity of the first component 210 and the difference between the first temperature T1 and the first temperature limit $T1_{lim}$.

In operation S240, the thermal resistance $R_\theta$ of the medium 290 may be adjusted based on at least one estimated value. For example, the controller 270 may maintain or increase the thermal resistance $R_\theta$ of the medium 290 when the estimated temperature increase rate $T1_{slope}$ is less than a set reference value. On the other hand, when the estimated temperature increase rate $T1_{slope}$ is equal to or greater than the set reference value, the controller 270 may maintain or decrease the thermal resistance $R_\theta$ of the medium 290. In addition, when the thermal margin TM1 of the first component 210 is equal to or greater than a set reference value, and when the thermal margin TM2 of the second component 220 is less than the set reference value, the controller 270 may maintain or increase the thermal resistance $R_\theta$ of the medium 290. On the other hand, when the thermal margin TM1 of the first component 210 is less than the present reference value, and when the thermal margin TM2 of the second component 220 is equal to or greater than the set reference value, the controller 270 may maintain or decrease the thermal resistance $R_\theta$ of the medium 290. Operation S240 will be described in more detail with reference to FIG. 8.

FIG. 7 illustrates an example of the medium 290 of FIG. 5, according to some example embodiments. In detail, FIG. 7 is a cross-sectional view of a medium 290a including an electrorheological fluid 293a and having a thermal resistance $R_\theta$ that is adjusted according to the control signal CTR from the controller 270 of FIG. 5. Although FIG. 7 illustrates an example in which the thermal resistance $R_\theta$ of the medium 290a is adjusted by a unit of the electrorheological fluid 293a, it may be understood that the thermal resistance $R_\theta$ of the medium 290a may be adjusted by units of a plurality of electrorheological fluids 293a.

Referring to FIG. 7, the medium 290a between a first component 210a and a second component 220a may include the electrorheological fluid 293a having thermal conductivity and being thermally coupled to the first component 210a and the second component 220a. The electrorheological fluid 293a may include particles having thermal conductivity and may be between a first electrode 291a and a second electrode 292a. The first electrode 291a and the second electrode 292a may have thermal conductivity like, for example, metals, and may provide an electric field to the electrorheological fluid 293a according to the control signal CTR received from the controller 270 of FIG. 5. The particles of the electrorheological fluid 293a may be aligned or dispersed and thus may have different thermal resistances.

Referring to the left side of FIG. 7, when a voltage V7 between the first electrode 291a and the second electrode 292a is approximately 0, that is, when no electric field is provided to the electrorheological fluid 293a, the particles included in the electrorheological fluid 293a may be dispersed, and a relatively small amount of heat may be transferred from the first component 210a to the second component 220a. Accordingly, the thermal resistance $R_\theta$ of the medium 290a between the first component 210a and the second component 220a may be equal to a thermal resistance $R\_DI_\theta$ in a state in which the particles of the electrorheological fluid 293a are dispersed, or may be greater than a thermal resistance $R\_AL_\theta$ in a state in which the particles of the electrorheological fluid 293a are aligned.

On the other hand, referring to the right side of FIG. 7, when the voltage V7 between the first electrode 291a and the second electrode 292a is greater than a voltage Va, that is, when an electric field is provided to the electrorheological fluid 293a, the particles of the electrorheological fluid 293a may be aligned in a chain shape in which the first electrode 291a and the second electrode 292a are connected to each other, and heat transferred from the first component 210a to the second component 220a may relatively increase. Accordingly, the thermal resistance $R_\theta$ of the medium 290a between the first component 210a and the second component 220a may be equal to thermal resistance $R\_AL_\theta$ of the medium 290a in a state in which the particles of the electrorheological fluid 293a are aligned, or may be lower than thermal resistance $R\_DI_\theta$ of the medium 290a in a state in which the particles of the electrorheological fluid 293a are dispersed.

Figure 8:
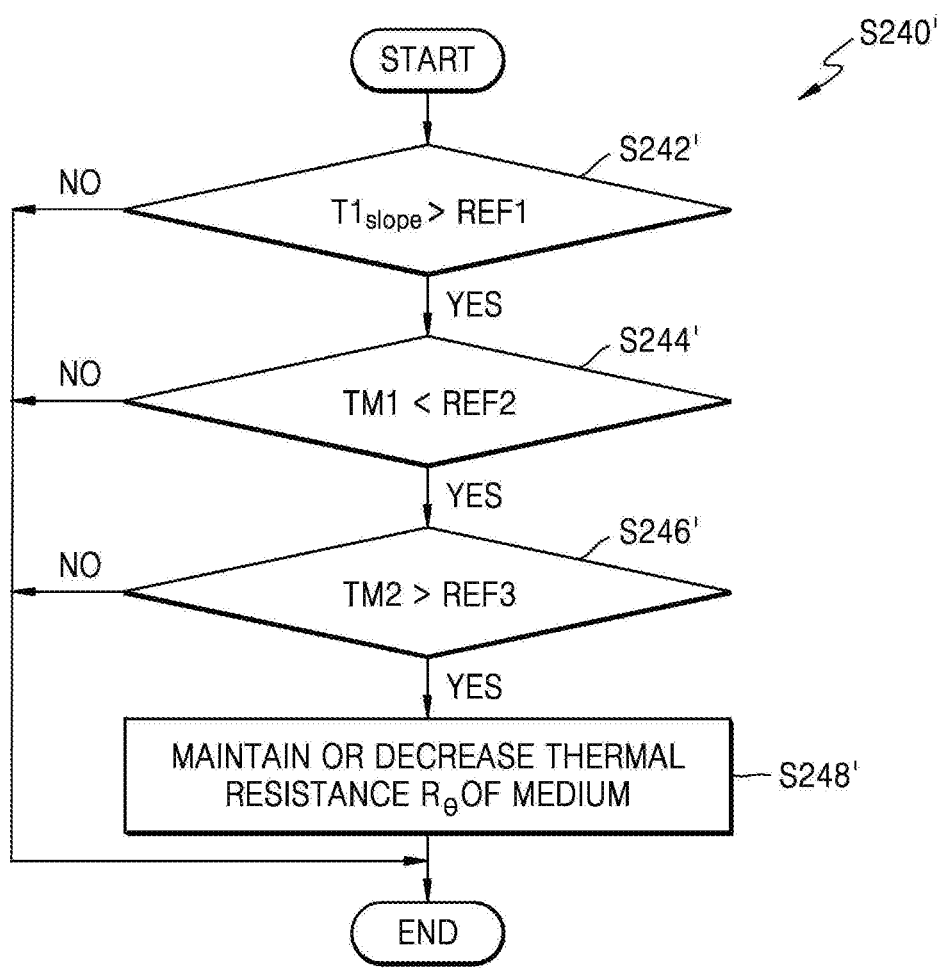
FIG. 8 is a flowchart of an example of operation S240 of the thermal management methods of FIG. 6 using a medium having an adjustable thermal resistance, according to some example embodiments.

FIG. 8 is a flowchart of an example of operation S240 of the thermal management methods of FIG. 6 using a medium having an adjustable thermal resistance, according to some example embodiments. As described with reference to FIG. 6, in operation S240' of FIG. 8 (corresponding with operation S240 of FIG. 6), the thermal resistance $R_\theta$ of the medium 290 may be adjusted based on at least one estimated value. In particular, FIG. 8 illustrates an example of an operation of maintaining or decreasing the thermal resistance $R_\theta$ of the medium 290. For example, operation S240' of FIG. 8 may be performed by the controller 270 of FIG. 5, and operations of FIG. 8 will be described with reference to FIG. 5.

Referring to FIG. 8, when the thermal resistance $R_\theta$ of the medium 290 decreases to delay the point in time when the first temperature T1 of the first component 210 reaches the first temperature limit $T1_{lim}$, the thermal margin TM1 of the first component 210 and/or the thermal margin TM2 of the second component 220 may be taken into account. That is, when the thermal margin TM1 of the first component 210 is sufficient, the thermal resistance $R_\theta$ of the medium 290 may not decrease. Also, when the thermal margin TM2 of the second component 220 is not sufficient, the heat transferred from the first component 210 to the second component 220 may advance the point in time when the second temperature T2 reaches the second temperature limit $T2_{lim}$. Thus, the thermal resistance $R_\theta$ of the medium 290 may decrease only when the second component 220 has a margin that is sufficient enough to store the heat transferred from the first component 210.

In operation S242', the temperature increase rate $T1_{slope}$ of the first component 210 may be compared with a first reference value REF1. For example, the controller 270 may compare an estimated temperature increase rate $T1_{slope}$ of the first component 210 with the first reference value REF1. When the temperature increase rate $T1_{slope}$ of the first component 210 does not exceed the first reference value REF1, the thermal resistance $R_\theta$ of the medium 290 may not decrease. On the other hand, when the temperature increase rate $T1_{slope}$ of the first component 210 exceeds the first reference value REF1, operation S244' may be subsequently performed.

In operation S244', the thermal margin TM1 of the first component 210 may be compared with a second reference value REF2. When the thermal margin TM1 of the first component 210 is equal to or greater than the second reference value REF2, the thermal resistance $R_\theta$ of the medium 290 may not decrease. However, when the thermal margin TM1 of the first component 210 is less than the second reference value REF2, operation S246' may be subsequently performed.

In operation S246', the thermal margin TM2 of the second component 220 may be compared with a third reference value REF3. For example, the controller 270 may compare an estimated thermal margin TM2 of the second component 220 with the third reference value REF3. When the thermal margin TM2 of the second component 220 is not greater than the third reference value REF3, the thermal resistance $R_\theta$ of the medium 290 may not decrease. On the other hand, when the thermal margin TM2 of the second component 220 is greater than the third reference value REF3, operation S248' may be subsequently performed.

In operation S248', the thermal resistance $R_\theta$ of the medium 290 may be maintained or may decrease. For example, the controller 270 may provide the control signal CTR for applying a voltage to the first and second electrodes 291a and 292a in such a manner that the thermal resistance $R_\theta$ of the medium 290 of FIG. 7 is maintained or decreases.

Figure 9:
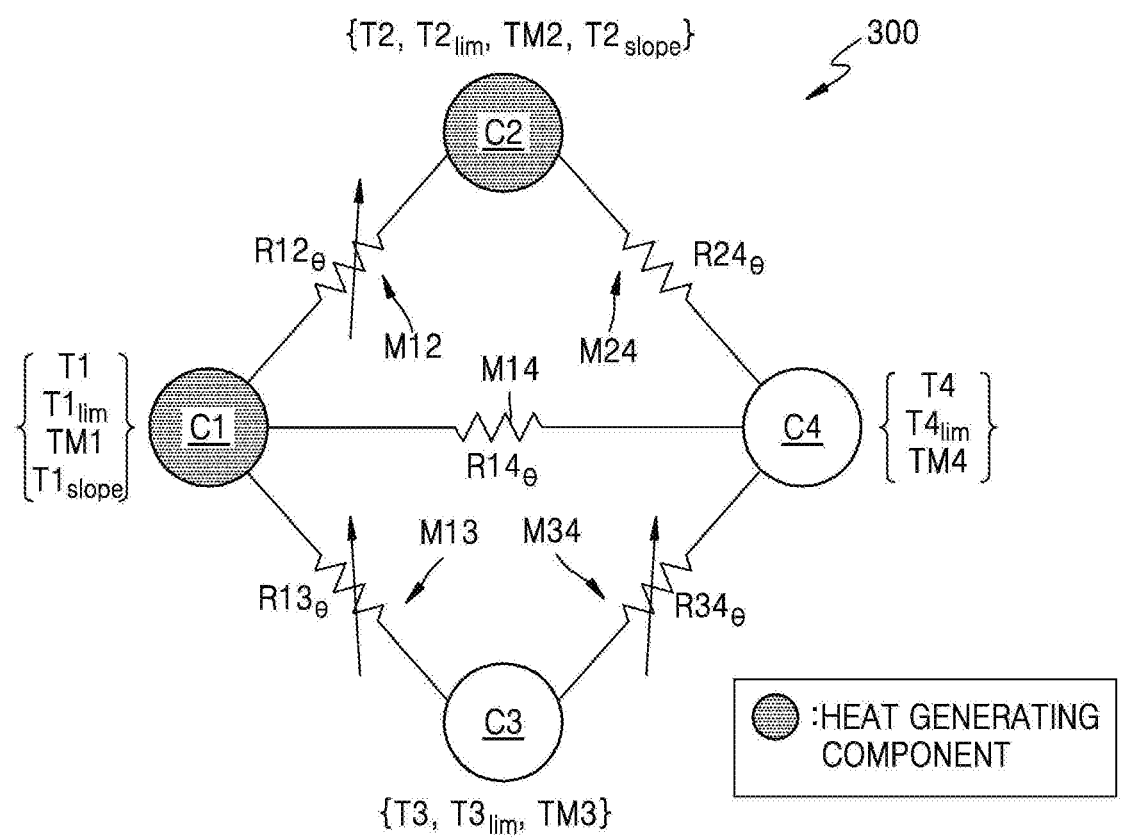
FIG. 9 is a block diagram of a theoretical model of an apparatus including multiple components, according to some example embodiments.

FIG. 9 is a block diagram of a theoretical model of an apparatus 300, according to some example embodiments. As illustrated in FIG. 9, the apparatus 300 may include first to fourth components C1 to C4 and media M12, M13, M14, M24, and M34 between the first to fourth components C1 to C4. Among the first to fourth components C1 to C4, the first and second components C1 and C2 may be heat-emitting components and the third and fourth components C3 and C4 may be non-heat-emitting components. In addition, among the media M12, M13, M14, M24, and M34, the media M12, M13, and M34 may have a variable thermal resistance and the media M14 and M24 may have a fixed thermal resistance.

As illustrated in FIG. 9, the theoretical model of the apparatus 300 may include nodes corresponding to the first to fourth components C1 to C4 and edges corresponding to the media M12, M13, M14, M24, and M34. As illustrated in FIG. 9, the first to fourth components C1 to C4 may each have parameters regarding, for example, a current temperature (e.g., the first temperature T1), a temperature limit (e.g., the first temperature limit $T1_{lim}$), a thermal margin (e.g., the thermal margin TM1), and an estimated temperature increase rate (e.g., the temperature increase rate $T1_{slope}$), and the media M12, M13, M14, M24, and M34 may respectively have thermal resistances $R12_\theta$, $R13_\theta$, $R14_\theta$, $R24_\theta$, and $R34_\theta$. In some example embodiments, only heat generating components may have parameters regarding an estimated temperature increase rate.

Components included in the apparatus 300 may be thermally coupled to at least two other components through at least two media. For example, as illustrated in FIG. 9, the first component C1, which is a heat-emitting component, may be thermally coupled to the second component C2 through the medium M12, to the third component C3 through the medium M13, and to the fourth component C4 through the medium M14. Parameters of components and thermal resistances of other media may be taken into account in order to determine variable thermal resistances $R12_\theta$, $R13_\theta$, and $R34_\theta$ of the medium M12, M13, and M34. For example, as described below with reference to FIG. 11, when the thermal resistance $R12_\theta$ of the medium M12 and the thermal resistance $R13_\theta$ of the medium M13 are adjusted to decrease an increase rate of the first temperature T1 of the first component C1, thermal margins TM2 and TM3 of the second and third components C2 and C3 may be taken into account. As described above, the apparatus 300 may be illustrated as a graph including nodes and edges, and as described below with reference to FIG. 10, to delay the earliest one among points in time when first to fourth temperatures T1 to T4 of the first to fourth components C1 to C4 respectively reach temperature limits $T1_{lim}$ to $T4_{lim}$, the thermal resistances $R12_\theta$, $R13_\theta$, and $R34_\theta$ may be determined by using various graph algorithms.

Figure 10:
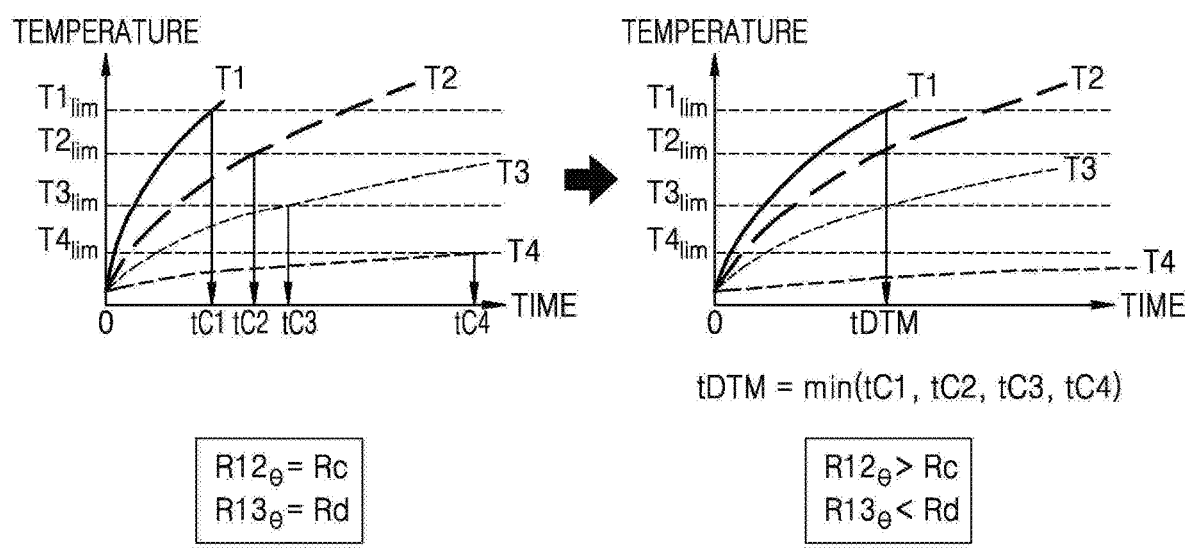
FIG. 10 illustrates graphs of thermal changes of components of FIG. 9, according to some example embodiments.

FIG. 10 illustrates graphs of thermal changes of the first to fourth components C1 to C4 of the graph of FIG. 9, according to some example embodiments. In particular, the graph on the left side of FIG. 10 illustrates the thermal changes of the first to fourth components C1 to C4 when the thermal resistances $R12_\theta$ and $R13_\theta$ of the media M12 and M13 have fixed values Rc and Rd, and the graph on the right side illustrates the thermal changes of the first to fourth components C1 to C4 when each of the thermal resistances $R12_\theta$ and $R13_\theta$ of the media M12 and M13 increases or decreases. As described above with reference to FIG. 9, it is assumed that the first and second components C1 and C2 are the heat-emitting components and the third and fourth components C3 and C4 are the non-heat-emitting components. In addition, it is assumed that the temperature limits $T1_{lim}$ to $T4_{lim}$ decrease in a stated order. Hereinafter, the graphs of FIG. 10 will be described with reference to FIG. 9.

Referring to the graph on the left side of FIG. 10, among first to fourth points in time tC1 to tC4 when the first to fourth components C1 to C4 respectively reach the first to fourth temperature limits $T1_{lim}$ to $T4_{lim}$, the first point in time tC1 when the first temperature T1 of the first component C1 reaches the first temperature limits $T1_{lim}$ may be the earliest. In this case, operations of the first component C1 and/or the second component C2 that are the heat-emitting components may be restricted by a dynamic thermal manager (e.g., the dynamic thermal manager 250 of FIG. 5) at the first point in time tC1.

Referring to the graph on the right side of FIG. 10, in comparison with the graph on the left side, when the thermal resistance $R12_\theta$ of the medium M12 increases and the thermal resistance $R13_\theta$ of the medium M13 decreases, a point in time when the operation of the first component C1 is restricted by the dynamic thermal manager (e.g., the dynamic thermal manager 250 of FIG. 5) according to a similar scenario may be delayed. As illustrated via the graph on the right side of FIG. 10, a point in time tDTM when the operations of the first component C1 and/or the second component C2 are restricted may be defined as being the earliest among the first to fourth points in time tC1 to tC4. When the thermal resistances $R12_\theta$ and $R13_\theta$ have appropriate values, the first to fourth points in time tC1 to tC4 may be similar to or the same as one another as the point in time tDTM.

Figure 11:
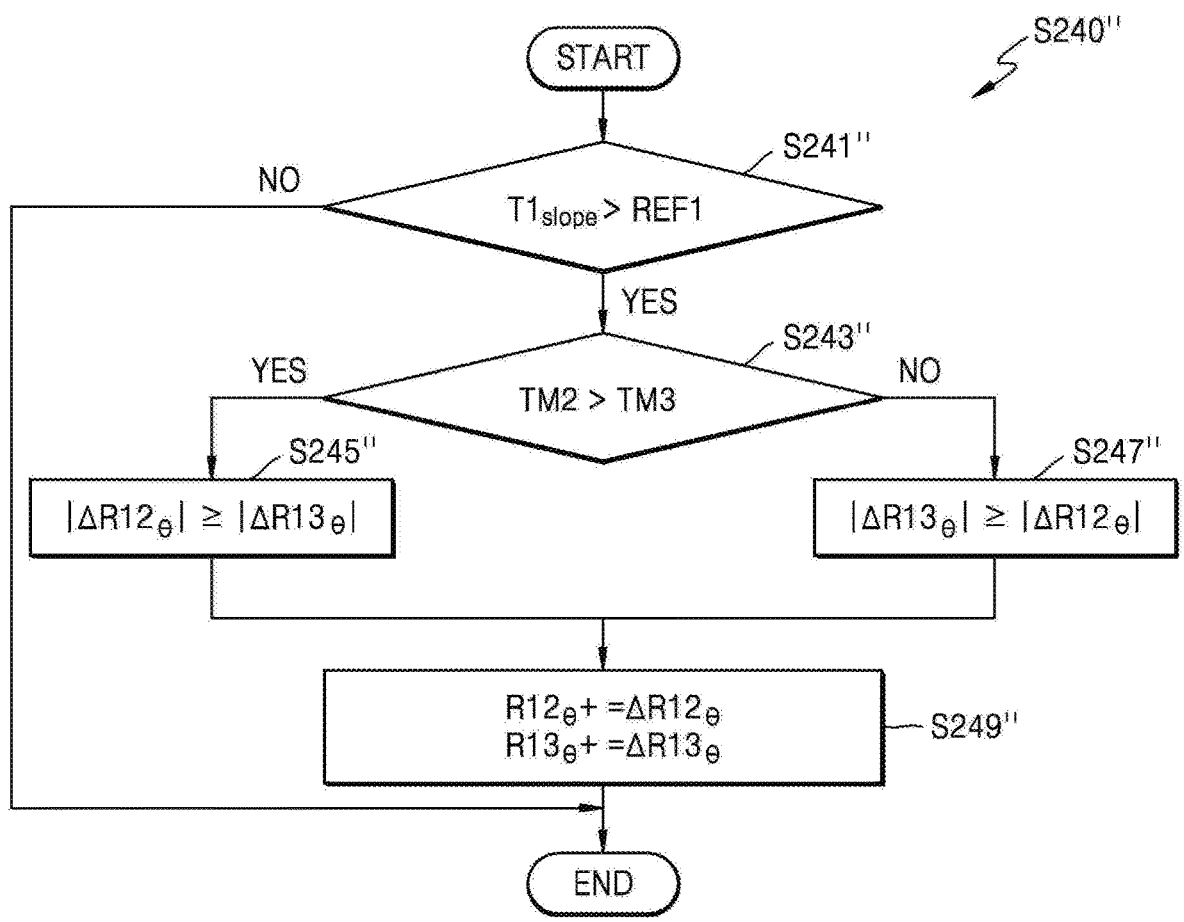
FIG. 11 is a flowchart of an example of operation S240 of the thermal management methods of FIG. 6 using two media having adjustable thermal resistances, according to some example embodiments.

FIG. 11 is a flowchart of an example of operation S240 of the thermal management methods of FIG. 6 (depicted in FIG. 11 as operation S240") using two media having adjustable thermal resistances, according to some example embodiments. In particular, FIG. 11 illustrates an example of an operation of determining sizes of thermal resistances $R12_\theta$ and $R13_\theta$ when media M12 and M13 respectively providing the variable thermal resistances $R12_\theta$ and $R13_\theta$ are thermally coupled to a first component C1 as in the apparatus 300 of FIG. 9. Hereinafter, operations of FIG. 11 will be described with reference to FIG. 9.

Referring to FIG. 11, when the thermal resistances $R12_\theta$ and $R13_\theta$ of the media M12 and M13 decrease to delay the point in time when the first temperature T1 of the first component C1 reaches the first temperature limit $T1_{lim}$, the thermal margins TM2 and TM3 of the second and third components C2 and C3 may be taken into account. For example, decrements $|\Delta R12_\theta|$ and $|\Delta R13_\theta|$ of the thermal resistances $R12_\theta$ and $R13_\theta$ may be determined based on the thermal margins TM2 and TM3 of the second and third components C2 and C3.

In operation S241", the temperature increase rate $T1_{slope}$ of the first component C1 may be compared with the first reference value REF1. When the temperature increase rate $T1_{slope}$ of the first component C1 does not exceed the first reference value REF1, the thermal resistances $R12_\theta$ and $R13_\theta$ of the media M12 and M13 may not decrease. On the other hand, when the temperature increase rate $T1_{slope}$ of the first component C1 exceeds the first reference value REF1, operation S243" may be subsequently performed.

In operation S243", the thermal margin TM2 of the second component C2 may be compared with the thermal margin TM3 of the third component C3. For example, the thermal margin TM3 of the third component C3 may be estimated in an operation (e.g., operation S220 of FIG. 6) prior to operation S240". When the thermal margin TM2 of the second component C2 is greater than the thermal margin TM3 of the third component C3, operation S245" may be performed in which the decrement $|\Delta R12_\theta|$ of the thermal resistance $R12_\theta$ of the medium M12 may be set to be equal to or greater than the decrement $|\Delta R13_\theta|$ of the thermal resistance $R13_\theta$ of the medium M13. On the other hand, when the thermal margin TM2 of the second component C2 is not greater than the thermal margin TM3 of the third component C3, operation S247" may be performed in which the decrement $|\Delta R13_\theta|$ of the thermal resistance $R13_\theta$ of the medium M13 may be set to be equal to or greater than the decrement $|\Delta R12_\theta|$ of the thermal resistance $R12_\theta$ of the medium M12. Accordingly, an increasing amount of heat may be transferred to components having greater thermal margins.

In operation S249", the thermal resistances $R12_\theta$ and $R13_\theta$ of the media M12 and M13 may be adjusted. For example, as illustrated in FIG. 11, the thermal resistances $R12_\theta$ and $R13_\theta$ may be set by adding variations $\Delta R12_\theta$ and $\Delta R13_\theta$ that are set in operation S245" or S247".

Figure 12:
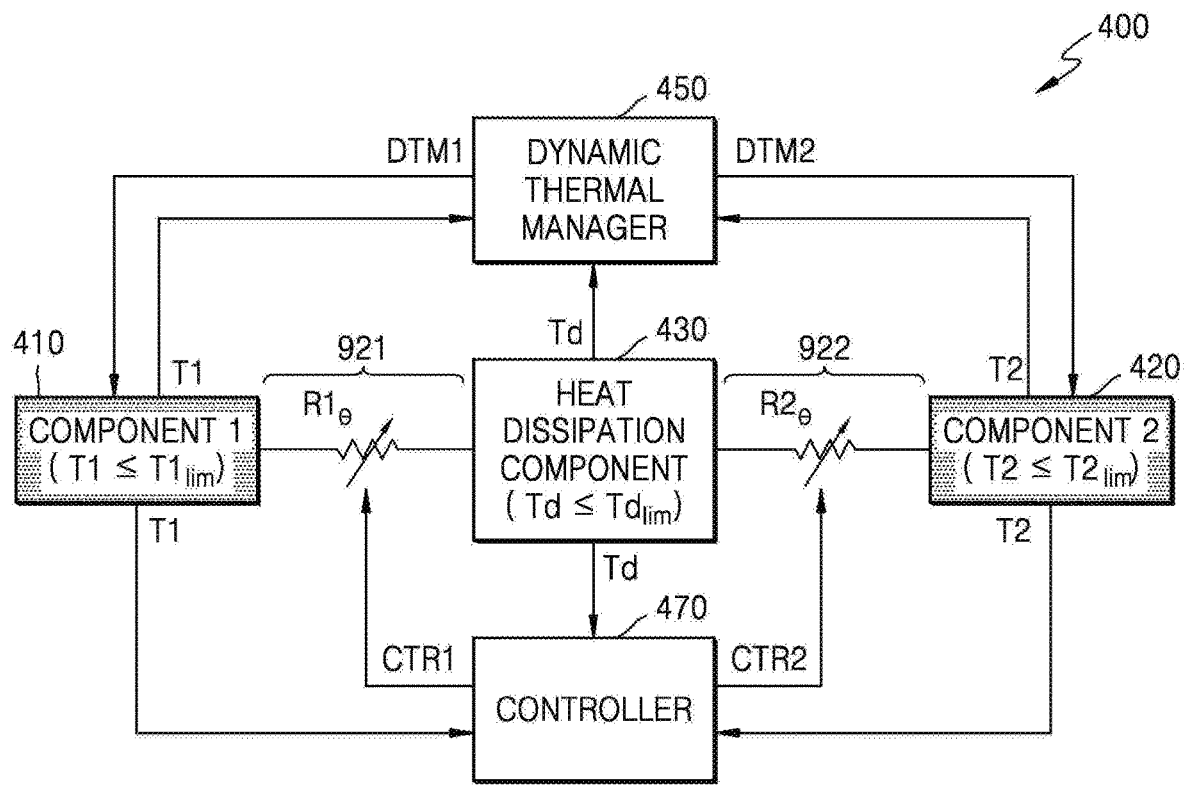
FIG. 12 is a block diagram of an apparatus including a heat dissipation component, according to some example embodiments.

FIG. 12 is a block diagram of an apparatus 400 including a heat dissipation component, according to some example embodiments. As illustrated in FIG. 12, the apparatus 400 may include a first component 410, a second component 420, a heat dissipation component 430, a dynamic thermal manager 450, a controller 470, a first medium 921, and a second medium 922. The first component 410, the second component 420, the dynamic thermal manager 450 and the controller 470 may be the same as or similar to the first component 210, the second component 220, the dynamic thermal manager 250 and the controller 270 of FIG. 5. The first component 410, the second component 420, the dynamic thermal manager 450 and the controller 470 may perform functions including the same functions as or similar functions to those of the first component 210, the second component 220, the dynamic thermal manager 250 and the controller 270 of FIG. 5. The descriptions that are already provided with reference to FIG. 5 will not be repeated.

Referring to FIG. 12, the first and second components 410 and 420 may be heat-emitting components, the first medium 921 between the first component 410 and the heat dissipation component 430 may have a variable thermal resistance $R1_\theta$, and the second medium 922 between the second component 420 and the heat dissipation component 430 may have a variable thermal resistance $R2_\theta$. Also, the first medium 921 and the second medium 922 may respectively have the thermal resistances $R1_\theta$ and $R2_\theta$ that are adjusted according to first and second control signals CTR1 and CTR2 from the controller 470. Also, the first component 410 may have a first temperature limit $T1_{lim}$, and the second component 420 may have a second temperature limit $T2_{lim}$.

To hinder or prevent overheating of the heat-emitting components (e.g., the first and second components 410 and 420) of the apparatus 400, the heat dissipation component 430 may absorb and emit heat emitted from the heat-emitting components. For example, the heat dissipation component 430 may have at least a portion that is exposed to the outside of the apparatus 400 or may have at least a portion that is exposed to an air current generated by a fan, etc. Similar to the first and second components 410 and 420, the heat dissipation component 430 may also have a temperature limit $Td_{lim}$.

The dynamic thermal manager 450 and the controller 470 may determine a temperature Td of the heat dissipation component 430. In some example embodiments, the dynamic thermal manager 150 and/or the controller 470 may acquire the temperature Td from the heat dissipation component 430. For example, the dynamic thermal manager 150 and/or the controller 470 may receive signals regarding the temperature Td from a temperature sensor arranged in the heat dissipation component 430 or may estimate the temperature Td based on various factors (e.g., an operation duration, supplied energy, etc.) affecting the first and second temperatures T1 and T2 of the first and second components 110 and 120, respectively.

As illustrated in FIG. 12, the first medium 921 having a variable thermal resistance $R1_\theta$ may be between the heat dissipation component 430 and the first component 410, and the second medium 922 having a variable thermal resistance $R2_\theta$ may be between the heat dissipation component 430 and the second component 420. As the thermal resistance $R1_\theta$ and the thermal resistance $R2_\theta$ of the first medium 921 and the second medium 922 are adjusted, the controller 470 may delay the point in time when the operations of the first component 410 and/or the second component 420 are restricted by the dynamic thermal manager 450. The operation of the controller 470 will be described below in detail with reference to FIGS. 13 and 14.

Figure 13:
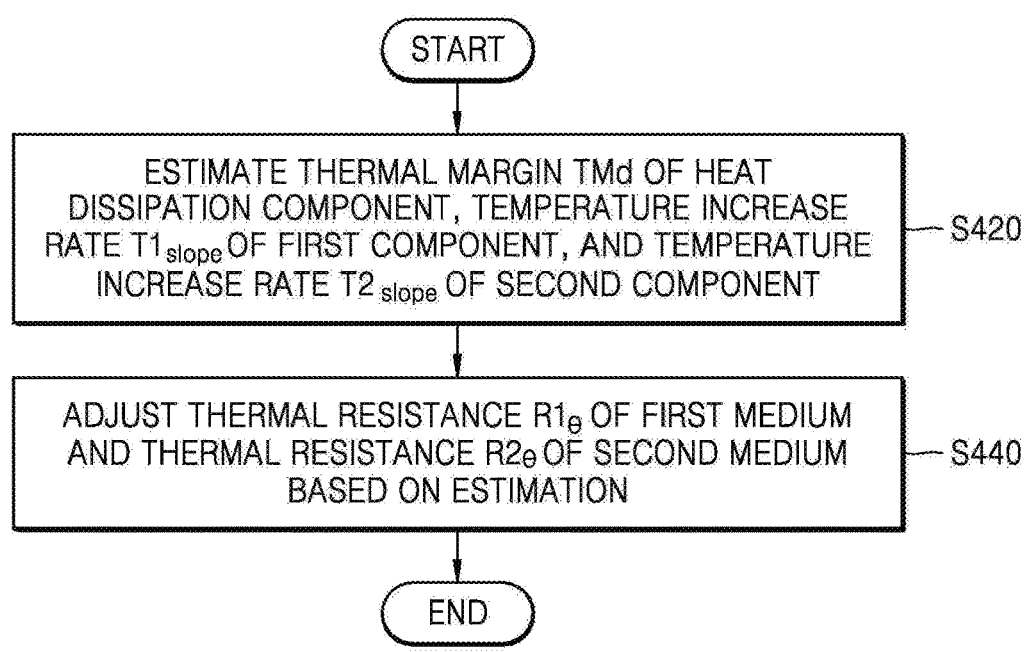
FIG. 13 is a flowchart of thermal management methods using a heat dissipation component, according to some example embodiments.

FIG. 13 is a flowchart of thermal management methods using a heat dissipation component, according to some example embodiments. For example, the thermal management methods of FIG. 13 may be performed by the controller 470 of FIG. 12. Operations of FIG. 13 will be described with reference to FIG. 12. As described below, a thermal margin TMd of the heat dissipation component 430 is effectively shared by the first and second components 410 and 420, and thus the point in time when the operations of the first component 410 and/or the second component 420 are restricted by the dynamic thermal manager 450 may be delayed.

In operation S420, the thermal margin TMd of the heat dissipation component 430, the temperature increase rate $T1_{slope}$, of the first component 410, and the temperature increase rate $T2_{slope}$ of the second component 420 may be estimated. For example, the controller 470 may calculate the temperature increase rate $T1_{slope}$ of the first component 410 based on at least one of a temperature of the first component 410 and an energy consumption amount thereof and may calculate the temperature increase rate $T2_{slope}$ of the second component 420 based on at least one of a temperature of the second component 420 and an energy consumption amount thereof. The controller 470 may calculate the thermal margin TMd of the heat dissipation component 430 based on a temperature Td of the heat dissipation component 430, a temperature limit $Td_{lim}$, and a thermal capacity of the heat dissipation component 430.

In operation S440, a thermal resistance $R1_\theta$ of the first medium 921 and a thermal resistance $R2_\theta$ of the second medium 922 may be adjusted. For example, the controller 470 may provide the first and second control signals CTR1 and CTR2 for adjusting the thermal resistance $R1_\theta$ of the first medium 921 and the thermal resistance $R2_\theta$ of the second medium 922, based on the thermal margin TMd of the heat dissipation component 430, the temperature increase rate $T1_{slope}$ of the first component 410, and the temperature increase rate $T2_{slope}$ of the second component 420. Operation S440 will be described below in detail with reference to FIG. 14.

Figure 14:
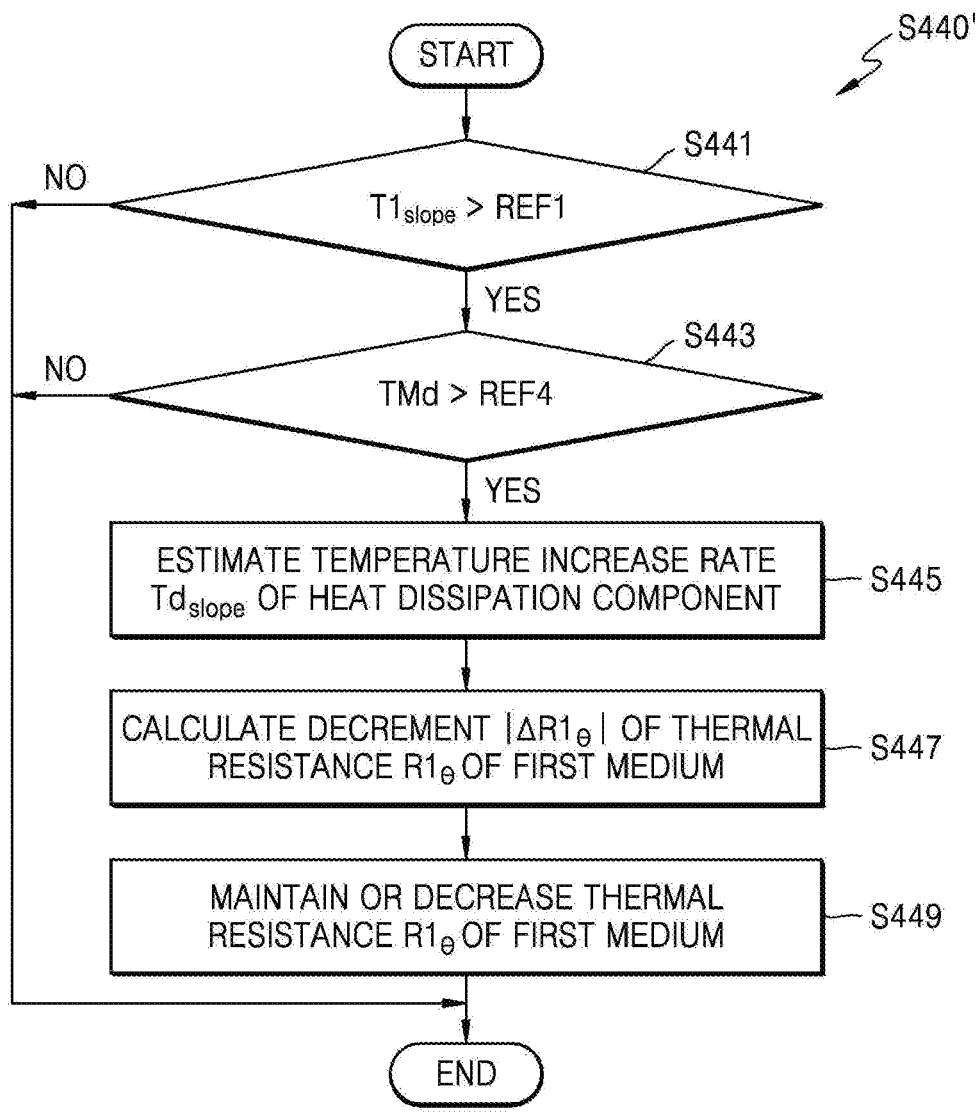
FIG. 14 is a flowchart of an example of operation S440 of the thermal management methods of FIG. 13, according to some example embodiments.

FIG. 14 is a flowchart of an example of operation S440 of the thermal management methods of FIG. 13, according to some example embodiments. As described above with reference to FIG. 13, in operation S440' of FIG. 14 (corresponding to operation S440 of FIG. 13), the thermal resistance $R1_\theta$ of the first component 410 and the thermal resistance $R2_\theta$ of the second component 420 may be adjusted. In particular, FIG. 14 illustrates an example of an operation of maintaining or decreasing the thermal resistance $R1_\theta$ of the first medium 921 of FIG. 12.

Referring to FIG. 14, since the temperature Td of the heat dissipation component 430 may be increased by the second component 420 and the first component 410, when the thermal resistance $R1_\theta$ of the first medium 921 decreases to delay the point in time when the first temperature T1 of the first component 410 of FIG. 12 reaches the first temperature limit $T1_{lim}$, the thermal margin TMd and a temperature increase rate $Td_{slope}$ of the heat dissipation component 430 may be taken into account.

In operation S441, the temperature increase rate $T1_{slope}$ of the first component 410 may be compared with a first reference value REF1. When the temperature increase rate $T1_{slope}$ of the first component 410 is not greater than the first reference value REF1, the thermal resistance $R1_\theta$ of the first medium 921 may not decrease. On the other hand, when the temperature increase rate $T1_{slope}$ of the first component 410 is greater than the first reference value REF1, operation S443 may be subsequently performed.

In operation S443, the thermal margin TMd of the heat dissipation component 430 may be compared with a fourth reference value REF4. When the thermal margin TMd of the heat dissipation component 430 is not greater than the fourth reference value REF4, the thermal resistance $R1_\theta$ of the first medium 921 may not decrease. On the other hand, when the thermal margin TMd of the heat dissipation component 430 is greater than the fourth reference value REF4, operation S445 may be subsequently performed.

In operation S445, the temperature increase rate $Td_{slope}$ of the heat dissipation component 430 may be estimated. For example, the controller 470 may calculate the temperature increase rate $Td_{slope}$ of the heat dissipation component 430 based on the temperature increase rate $T2_{slope}$ of the second component 420 and the thermal resistance $R2_\theta$ of the second medium 922. The calculated temperature increase rate $Td_{slope}$ of the heat dissipation component 430 may correspond to a change in the temperature Td of the heat dissipation component 430 that is affected by the second component 420.

In operation S447, a decrement $|\Delta R1_\theta|$ of the thermal resistance $R1_\theta$ of the first medium 921 may be calculated. For example, the controller 470 may determine the decrement $|\Delta R1_\theta|$ of the thermal resistance $R1_\theta$ based on the temperature increase rate $Td_{slope}$ of the heat dissipation component 430. That is, as the temperature increase rate $Td_{slope}$ of the heat dissipation component 430 is high, the decrement $|\Delta R1_\theta|$ of the thermal resistance $R1_\theta$ may become small.

In operation S449, the thermal resistance $R1_\theta$ of the first medium 921 may be maintained or decreased. For example, the controller 470 may maintain the thermal resistance $R1_\theta$ of the first medium 921 (e.g., $\Delta R1_\theta=0$) or decrease the same according to the decrement $|\Delta R1_\theta|$ that is calculated in operation S447.

Figure 15:
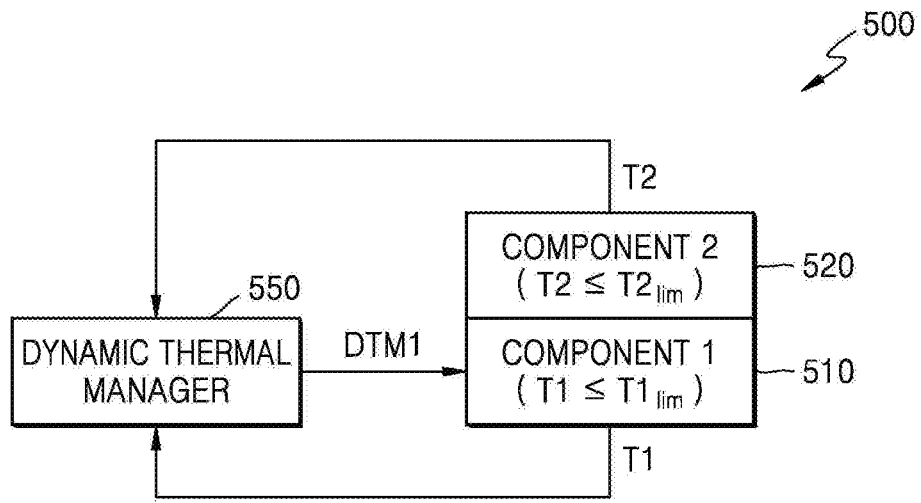
FIG. 15 is a block diagram of an apparatus including a component having a variable thermal capacity, according to some example embodiments.

FIG. 15 is a block diagram of an apparatus 500 including a component having a variable thermal capacity, according to some example embodiments. As illustrated in FIG. 15, the apparatus 500 may include a first component 510, a second component 520, and a dynamic thermal manager 550. In the apparatus 500 of FIG. 15, the second component 520 may have a variable thermal capacity. The first component 510, the second component 520 and the dynamic thermal manager 550 of FIG. 15 may be similar to or the same as the first component 110, the second component 120 and the dynamic thermal manager 150 of FIG. 1. The first component 510 and the dynamic thermal manager 550 of FIG. 15 may perform similar functions to or the same functions as the first component 110 and the dynamic thermal manager 150 of FIG. 1. The descriptions that are provided with reference to FIG. 1 will not be repeated.

The second component 520 may be thermally coupled to the first component 510 and may have a variable thermal capacity C2. That is, a temperature (e.g., the second temperature T2) of the second component 520 may differently increase due to heat transferred from the first component 510, and accordingly, a temperature (e.g., the first temperature T1) of the first component 510 that is thermally coupled to the second component 520 may also differently increase. For example, when the thermal capacity of the second component 520 is relatively low, the first and second temperatures T1 and T2 may relatively quickly increase due to heat generated by the first component 510. On the other hand, when the thermal capacity of the second component 520 is relatively high, the first and second temperatures T1 and T2 of the first component 510 and the second component 520 may relatively slowly increase due to the heat generated by the first component 510. That is, a change in the thermal capacity of the second component 520 may result in a change in the entire thermal capacity $C_\theta$ of the first component 510 and the second component 520 that are thermally coupled to each other.

Figure 16:
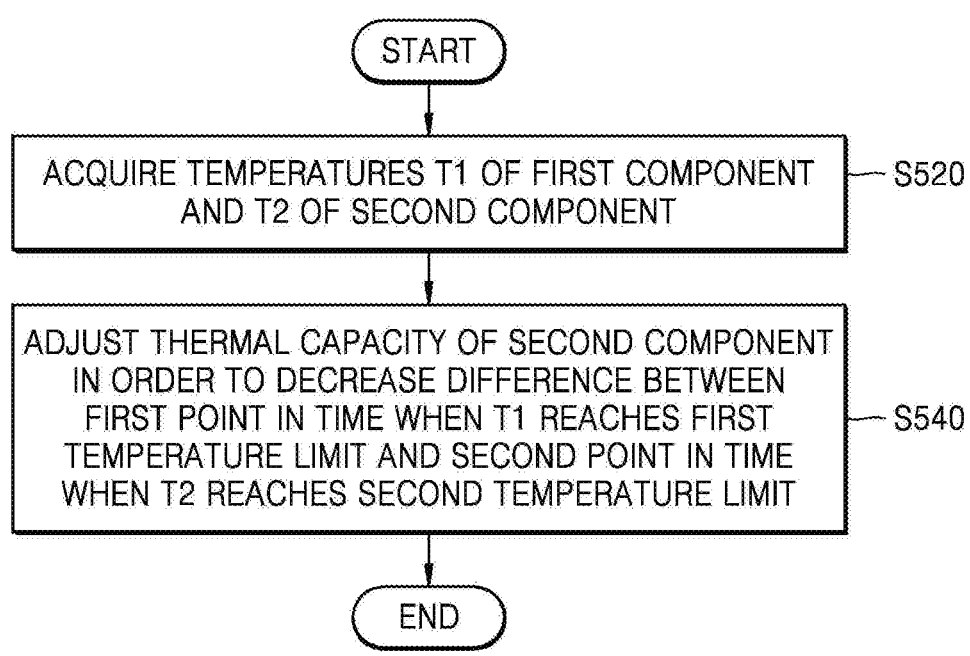
FIG. 16 is a flowchart of thermal management methods using a component having a variable thermal capacity, according to some example embodiments.

FIG. 16 is a flowchart of thermal management methods using a component having a variable thermal capacity, according to some example embodiments. For example, the thermal management methods of FIG. 16 may be performed by the apparatus 500 of FIG. 15. Operations of FIG. 16 will be described with reference to FIG. 15.

Referring to FIG. 16, in operation S520, the temperatures, that is, the first and second temperatures T1 and T2, of the first component 510 and the second component 520, respectively, may be acquired. The first and second temperatures T1 and T2 may be detected by a temperature sensor or may be estimated based on factors that cause a thermal change.

In operation S540, the thermal capacity of the second component 520 may be adjusted to decrease a difference between a first point in time and a second point in time. The first point in time and the second point in time may refer to a point in time when the first temperature T1 of the first component 510 reaches the first temperature limit $T1_{lim}$ and a point in time when the second temperature T2 of the second component 520 reaches the second temperature limit $T2_{lim}$, respectively.

Figure 17:
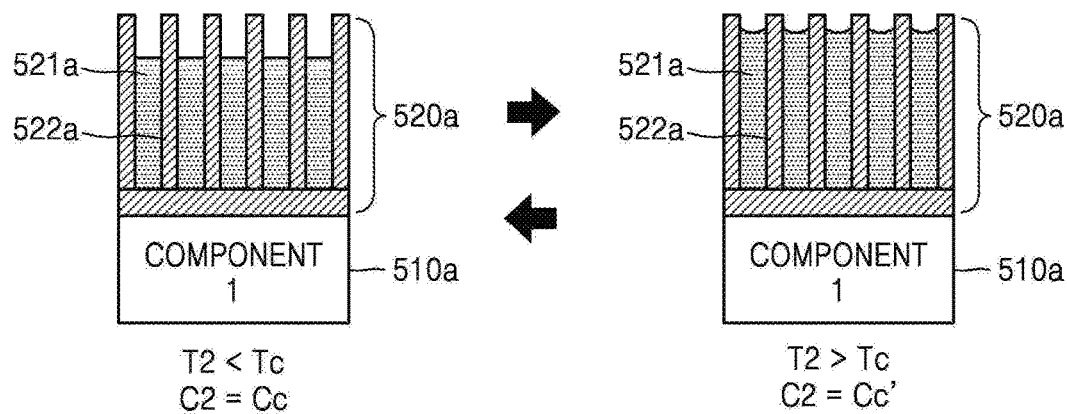
FIG. 17 illustrates an example of a second component of FIG. 15, according to some example embodiments.

FIG. 17 illustrates an example of the second component 520 of FIG. 15, according to some example embodiments. In detail, FIG. 17 is a cross-sectional view of a second component 520a reacting to the first temperature T1 of a first component 510a of FIG. 17.

As illustrated in FIG. 17, a second component 520a may include a material 521a of which a phase changes at a temperature below the second temperature limit $T2_{lim}$. For example, the phase of the material 521a may transit between at least two states among a solid state, a liquid state, a gas state, and a plasma state, at a temperature below the second temperature limit $T2_{lim}$. As a non-limited example, the material 521a may include paraffin wax. Accordingly, specific heat of the material 521a may change, and as a result, a thermal capacity C2 of the second component 520a including the material 521a may also change. The material 521a may be disposed within a support 522a. For example, the support 522a may include a material, e.g., metal, which has high thermal conductivity.

Referring to the left side of FIG. 17, when the second temperature T2 is less than a temperature Tc, the material 521a may be in a solid state, and accordingly, the thermal capacity C2 of the second component 520a may be equal to a thermal capacity Cc. On the other hand, referring to the right side of FIG. 17, when the second temperature T2 is greater than the temperature Tc, the material 521a may be in a liquid state, and accordingly, the thermal capacity C2 of the second component 520a may be equal to a thermal capacity Cc'. When the material 521a has higher specific heat in the liquid state than in the solid state, the thermal capacity Cc' may be greater than the thermal capacity Cc.

When the phase of the material 521a changes, absorption or emission of latent heat may occur. For example, when the phase of the material 521a changes due to heat generated by the first component 510a in a direction in which enthalpy (e.g., from a solid to a liquid) is high, the latent heat may be absorbed, and thus the first and second temperatures T1 and T2 of the first and second components 510a and 520a may not greatly increase.

Figure 18:
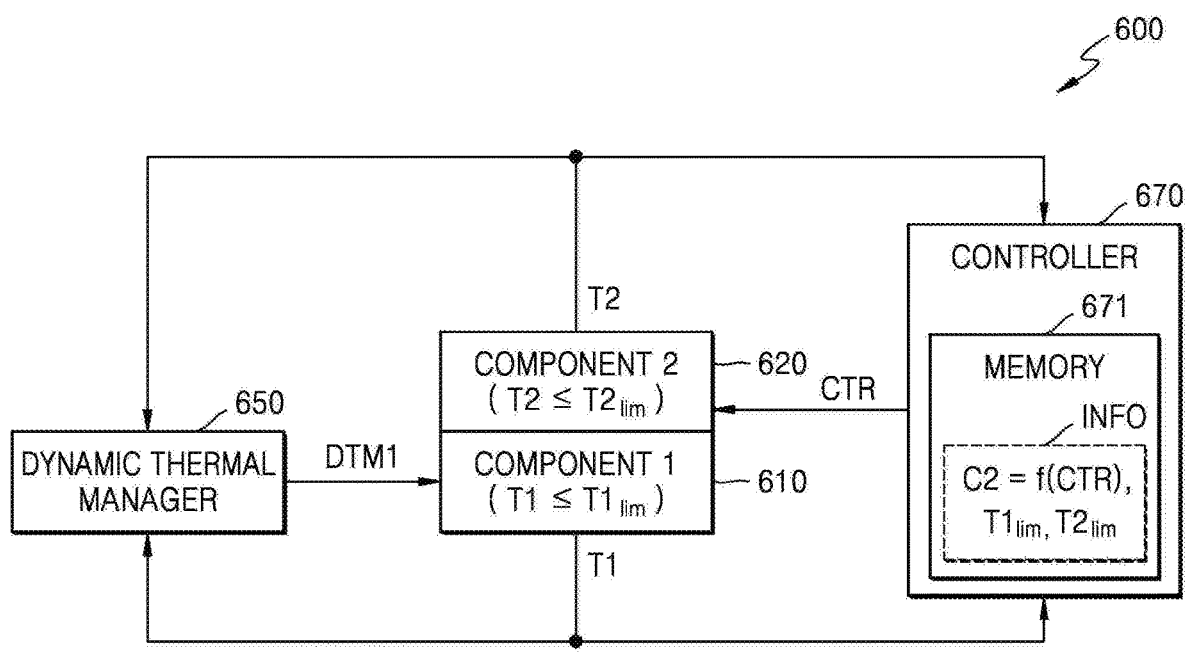
FIG. 18 is a block diagram of an apparatus including a controller in communication with a component having a variable thermal capacity, according to some example embodiments.

FIG. 18 is a block diagram of an apparatus 600 including a controller in communication with a component having a variable thermal capacity, according to some example embodiments. As illustrated in FIG. 18, the apparatus 600 may include a first component 610, a second component 620, a dynamic thermal manager 650, and a controller 670. The second component 620 of the apparatus 600 may receive a control signal CTR from the controller 670 and may have a thermal capacity C2 that varies in response to the control signal CTR. The first component 610, the second component 620, the dynamic thermal manager 650 and the controller 670 of the apparatus 600 may be the same as or similar to the first component 210, the second component 220, the dynamic thermal manager 250, and the controller 270 of FIG. 5. The first component 610, the second component 620, the dynamic thermal manager 650 and the controller 670 of the apparatus 600 may perform the same functions as or similar functions to the first component 210, the second component 220, the dynamic thermal manager 250, and the controller 270 of FIG. 5. The descriptions that are provided with reference to FIG. 5 will not be repeated.

The controller 670 may adjust a thermal capacity C2 of the second component 620. As illustrated in FIG. 18, the controller 670 may acquire first and second temperatures T1 and T2 of the first and second components 610 and 620 and may adjust the thermal capacity C2 of the second component 620 via the control signal CTR based on information stored in a memory 671, that is, first and second temperature limit $T1_{lim}$ and $T2_{lim}$ and information C2=f(CTR) regarding a relationship between the control signal CTR and the thermal capacity C2 of the second component 620. For example, the controller 670 may adjust the thermal capacity C2 of the second component 620 via the control signal CTR in such a manner that an earlier one of a first point in time when the first temperature T1 of the first component 610 reaches the first temperature limit $T1_{lim}$ and a second point in time when the second temperature T2 of the second component 620 reaches the second temperature limit $T2_{lim}$ is delayed. In some example embodiments, the controller 670 may be included in the dynamic thermal manager 650.

Figure 19:
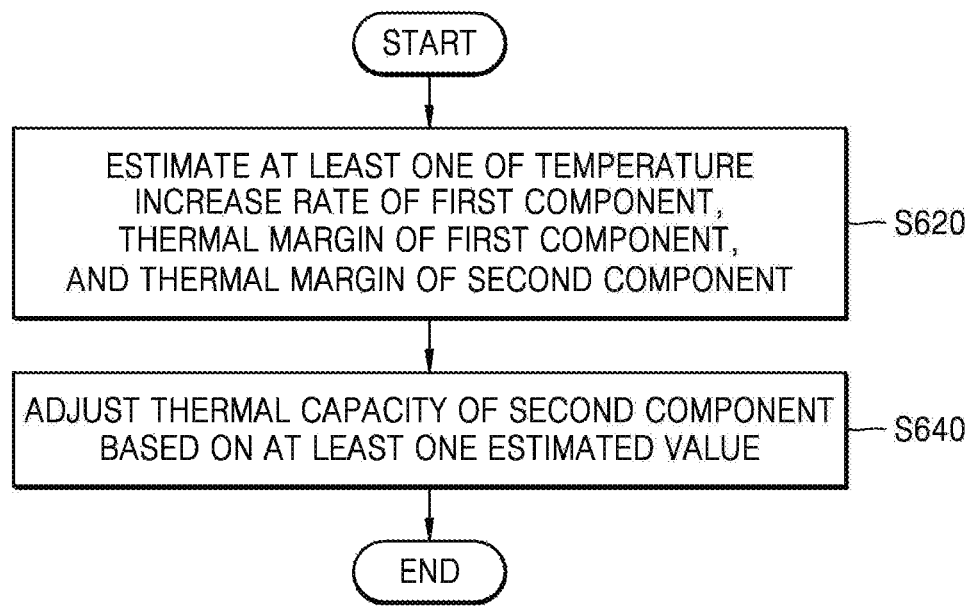
FIG. 19 is a flowchart of thermal management methods using a controller in communication with a component having a variable thermal capacity, according to some example embodiments.

FIG. 19 is a flowchart of thermal management methods using a controller in communication with a component having a variable thermal capacity, according to some example embodiments. For example, the thermal management methods of FIG. 19 may be performed by the controller 670 of FIG. 18. Referring to FIG. 19, it is assumed that the first component 610 of FIG. 18 is a heat-emitting component, and the thermal management methods of FIG. 19 will be described with reference to FIG. 18.

Referring to FIG. 19, in operation S620, at least one of a temperature increase rate $T1_{slope}$ of the first component 610, a thermal margin TM1 of the first component 610, and a thermal margin TM2 of the second component 620 may be estimated. For example, the thermal margin TM2 of the second component 620 may be calculated based on a current thermal capacity thereof or based on an upper limit thermal capacity thereof.

In operation S640, the thermal capacity C2 of the second component 620 may be adjusted based on an estimated value. For example, when the temperature increase rate $T1_{slope}$ of the first component 610 is equal to or greater than a first reference value, the thermal margin TM1 of the first component 610 is less than a second reference value, and the thermal margin TM2 of the second component 620 is equal to or greater than a third reference value, the controller 670 may maintain or increase the thermal capacity C2 of the second component 620. On the other hand, when the temperature increase rate $T1_{slope}$ of the first component 610 is less than the first reference value, the thermal margin TM1 of the first component 610 is equal to or greater than the second reference value, and the thermal margin TM2 of the second component 620 is less than the third reference value, the controller 670 may maintain or decrease the thermal capacity C2 of the second component 620.

Figure 20:
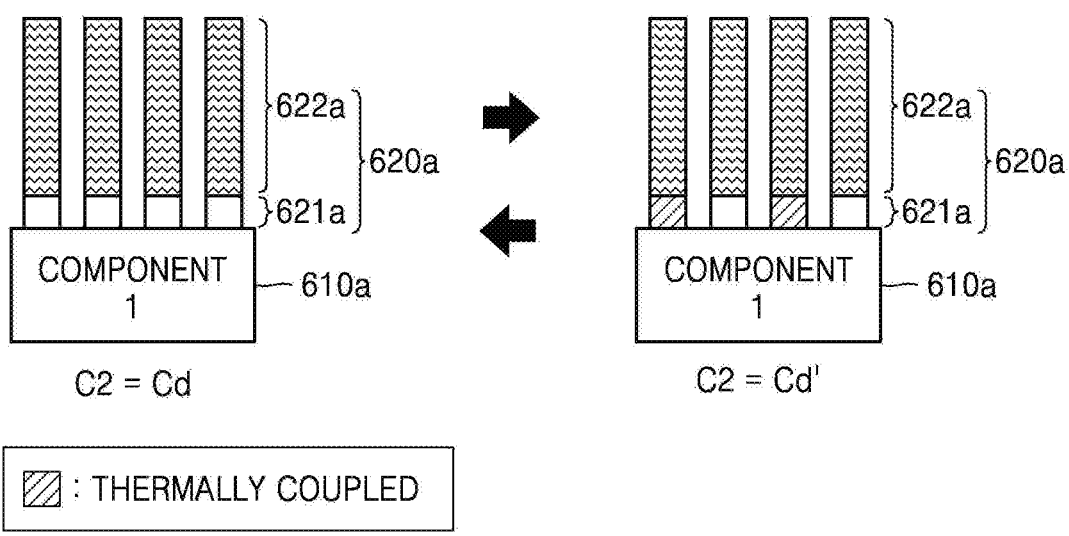
FIG. 20 illustrates an example of a second component of FIG. 18, according to some example embodiments.

FIG. 20 illustrates an example of the second component 620 of FIG. 18, according to some example embodiments. As illustrated in FIG. 20, a second component 620*a* may include multiple cells 622*a* and media 621*a* that thermally couple the cells 622*a* to a first component 610*a*. The cell 622*a* may indicate a unit having certain volume and thermal capacity. Although FIG. 20 illustrates that the second component 620*a* includes four cells 622*a*, the second component 620*a* may include one cell, at most three cells, or at least five cells, and volumes and/or thermal capacities of the cells may differ.

The media 621*a* may thermally couple or separate the cells 622*a* to or from the first component 610*a* in response to the control signal CTR from the controller 670. Alternatively, the media 621*a* may thermally couple the cells 622*a* to the first component 610*a* strongly or weakly in response to the control signal CTR from the controller 670. Accordingly, the thermal capacity C2 of the second component 620*a* with regard to heat generated by the first component 610*a* may vary. For example, in response to the control signal CTR, the media 621*a* between the first component 610*a* and the cells 622*a* may provide thermal resistance that varies.

Referring to the left side of FIG. 20, in response to the control signal CTR, the media 621*a* may thermally separate the cells 622*a* from the first component 610*a*. Accordingly, the thermal capacity C2 of the second component 620*a* with regard to the heat generated by the first component 610*a* may be equal to a thermal capacity Cd. On the other hand, referring to the right side of FIG. 20, at least one of the media 621*a* may thermally couple at least one of the cells 622*a* (e.g., two cells 622*a* illustrated in FIG. 20) to the first component 610*a*, in response to the control signal CTR. As a result, the thermal capacity C2 of the second component 620*a* with regard to the heat generated by the first component 610*a* may be equal to a thermal capacity Cd', and the thermal capacity Cd' may be equal to or greater than the thermal capacity Cd.

Figure 21:
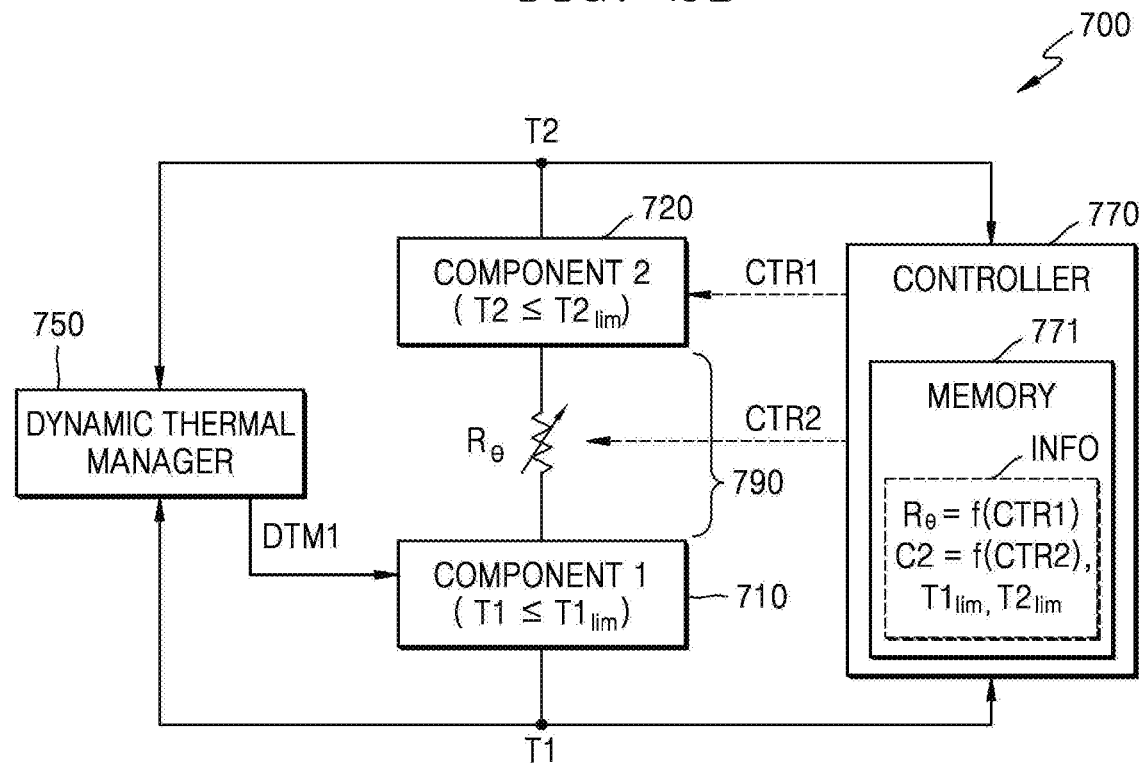
FIG. 21 is a block diagram of an apparatus including a controller in communication with a medium having an adjustable thermal resistance and a component having a variable thermal capacity, according to some example embodiments.

FIG. 21 is a block diagram of an apparatus 700 including a controller in communication with a medium having an adjustable thermal resistance and a component having a variable thermal capacity, according to some example embodiments. As illustrated in FIG. 21, the apparatus 700 may include a first component 710, a second component 720, a dynamic thermal manager 750, a controller 770, and a medium 790. In some example embodiments, the controller 770 includes a memory 771. Referring to FIG. 21, the second component 720 may have a variable thermal capacity C2 and may be thermally coupled to the first component 710 through the medium 790 that has a variable thermal resistance $R_\theta$. The first component 710, the second component 720, the dynamic thermal manager 750, the controller 770 and the memory 771 of the apparatus 700 may be the same as or similar to the first component 210, the second component 220, the dynamic thermal manager 250, the controller 270 and the memory 271 of FIG. 5. The first component 710, the second component 720, the dynamic thermal manager 750, the controller 770 and the memory 771 of the apparatus 700 may perform the same functions as or similar functions to the first component 210, the second component 220, the dynamic thermal manager 250, the controller 270 and the memory 271 of FIG. 5. The descriptions that are provided with reference to FIG. 5 will not be repeated.

The thermal capacity C2 of the second component 720 and the thermal resistance $R_\theta$ of the medium 790 may be adjusted to decrease a difference between a first point in time when a first temperature T1 of the first component 710 reaches a first temperature limit $T1_{lim}$ and a second point in time when a second temperature T2 of the second component 720 reaches a second temperature limit $T2_{lim}$ or to delay an earlier one of the first point in time and the second point in time. For example, the thermal capacity C2 of the second component 720 may be adjusted based on heat that is transferred from the first component 710 through the medium 790 or based on a first control signal CTR1 from the controller 770. In addition, the thermal resistance $R_\theta$ of the medium 790 may be adjusted based on heat generated by the first component 710 or a second control signal CTR2 from the controller 770.

The controller 770 may include a memory 771, and the memory 771 may store information INFO used to adjust the thermal resistance $R_\theta$ of the medium 790 and the thermal capacity C2 of the second component 720. For example, as illustrated in FIG. 21, the information INFO stored in memory 771 may include the first and second temperature limits $T1_{lim}$ and $T2_{lim}$, respectively, information C2=f(CTR1) regarding a relationship between the control signal CTR1 and the thermal capacity C2 of the second component 720, and information $R_\theta$=f(CTR2) regarding a relationship between the control signal CTR2 and the thermal resistance $R_\theta$ as thermal resistance characteristics of the medium 790. The controller 770 may generate the control signals CTR1 and CTR2 by referring to the information INFO stored in the memory 271, based on the first and second temperatures T1 and T2, respectively.

Figure 22:
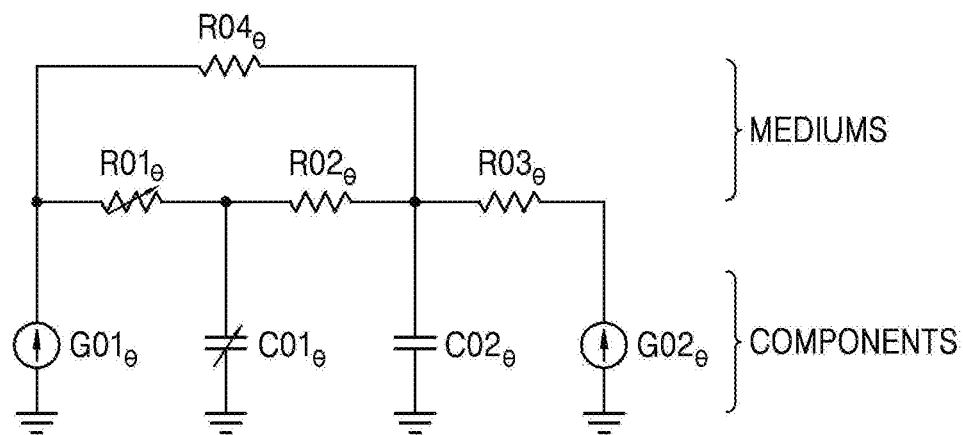
FIG. 22 is a circuit diagram of a modeled apparatus according to some example embodiments.

FIG. 22 is a circuit diagram of a model of an apparatus, according to some example embodiments. As illustrated in FIG. 22, devices may correspond to components and media of an apparatus, a current may correspond to heat in the modeled apparatus, and a voltage of each node may correspond to a temperature of the modeled apparatus.

The components included in the apparatus may be represented as current generators or capacitors, and the media may be represented as resistances. For example, as illustrated in FIG. 22, components that generate heat may be respectively modeled as current generators $G01_θ$ and $G02_θ$, and components that do not generate heat may be respectively modeled as capacitors $C01_θ$ and $C02_θ$. In particular, a component, e.g., the second component 520 of FIG. 15, which has a variable thermal capacity may be represented as a variable capacitor $C01_θ$. In addition, the media may be respectively represented as resistances $R01_θ$, $R02_θ$, $R03_θ$, and $R04_θ$. In particular, a component, e.g., the medium 190 of FIG. 1, which has a variable thermal resistance may be represented as a variable resistance $R01_θ$. In some example embodiments, when the variable thermal capacity of the component and the variable thermal resistance of the media are adjusted by a controller (e.g., the controller 770 of FIG. 21), the controller may adjust the thermal capacity and the thermal resistance by modeling the circuit diagram of FIG. 22.

Figure 23A:
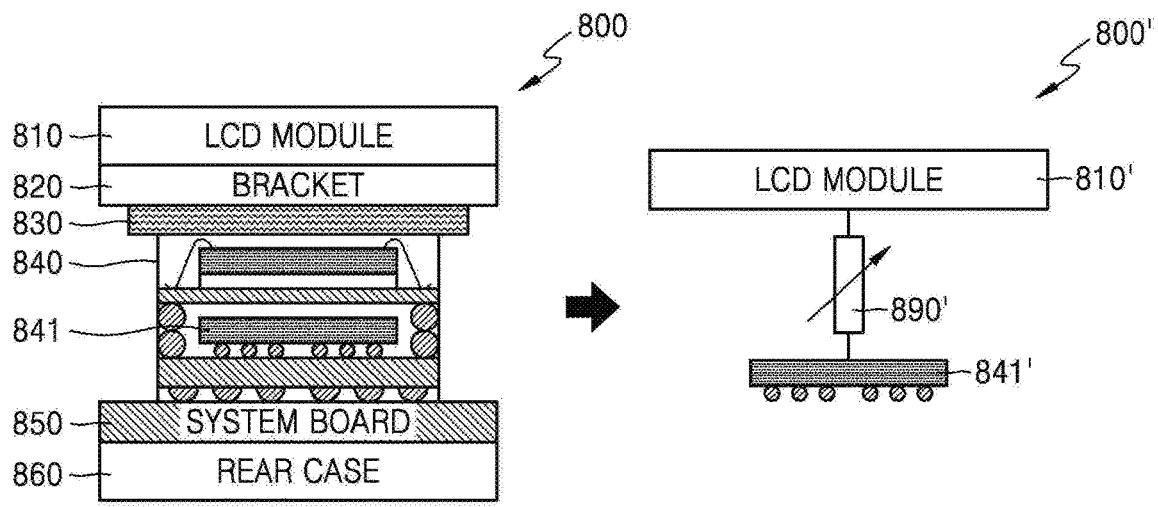
FIGS. 23A to 23C are block diagrams of apparatuses and other apparatuses that are respectively modeled based on the apparatuses, according to some example embodiments.
Figure 23B:
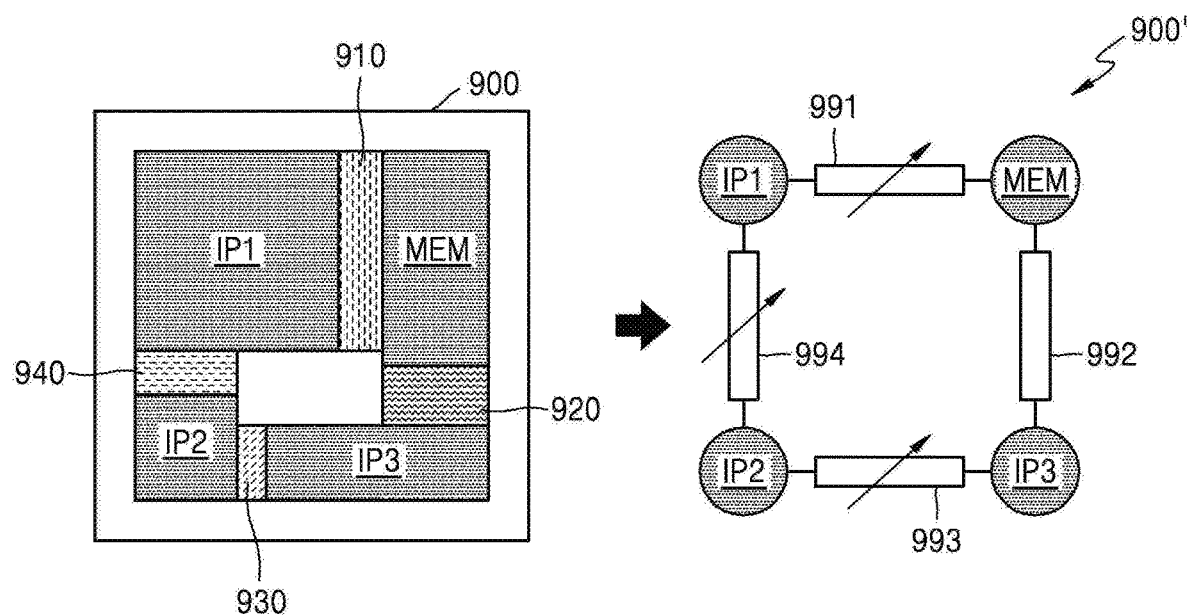
Figure 23C:
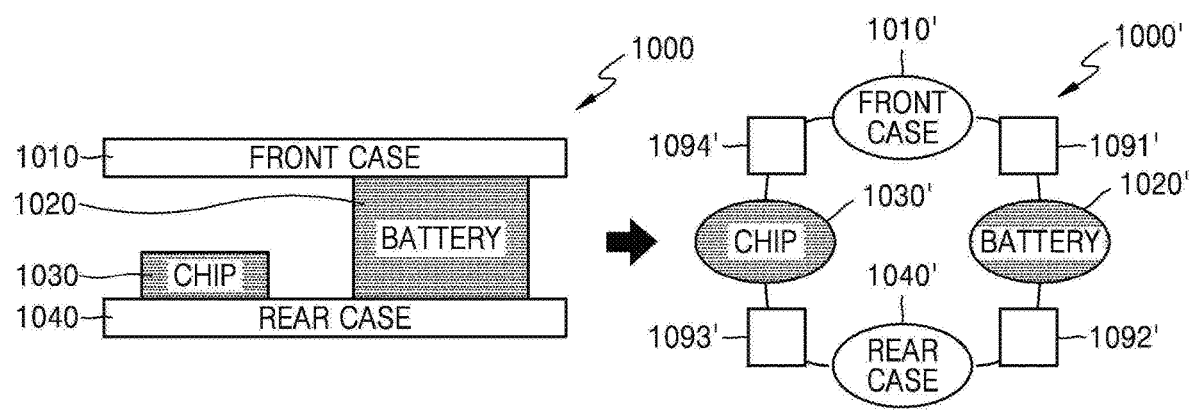

FIGS. 23A to 23C are block diagrams of apparatuses 800, 900, and 1000 and apparatuses 800', 900', and 1000' that are respectively modeled based on the apparatuses 800, 900, and 1000, according to some example embodiments. The thermal management methods according to some of the above example embodiments may be performed by the apparatuses 800', 900', and 1000' of FIGS. 23A to 23C.

Referring to FIG. 23A, the apparatus 800 may be an electronic device and may include a chip 841, which is a heat-emitting component, and a liquid crystal display (LCD) module 810 that is exposed to the outside. Referring to the left side of FIG. 23A, the chip 841 may be included in a package 840, and the package 840 may be placed on a system board 850 disposed on a rear case 860. A medium 830, a bracket 820, and the LCD module 810 may be sequentially stacked with respect to the package 840. The medium 830 may provide a variable thermal resistance between the bracket 820 and the package 840 or may have a variable thermal capacity as a component included in the apparatus 800. When the medium 830 has a thermal resistance and/or thermal capacity varying according to an external signal applied thereto, the controller that controls the thermal resistance and/or the thermal capacity of the medium 830 may be included in the chip 841 or in a package that is different from the package 840.

The chip 841 may consume power and thus generate heat. The heat generated by the chip 841 may be transferred to the LCD module 810, which is exposed to the outside of the apparatus 800, through the package 840, the medium 830, and the bracket 820, and the LCD module 810 may have a temperature limit to ensure the safety of a user of the apparatus 800. Also, as a temperature of the chip 841 increases, the chip 841 may deteriorate or malfunction, and thus, the chip 841 may also have a temperature limit. The temperature limit of the chip 841 may be greater than the temperature limit of the LCD module 810.

Referring to the right side of FIG. 23A, the apparatus 800 may be considered as corresponding to the apparatus 800' including an LCD module 810', a chip 841', and a variable device 890'. The LCD module 810' and the chip 841' may each have a temperature limit, and the variable device 890' may include the medium 830 having the variable thermal resistance and/or variable thermal capacity in the apparatus 800 as well as a fixed thermal resistance and/or thermal capacity of components disposed between the chip 841 and the LCD module 810.

Referring to FIG. 23B, the apparatus 900 may be one chip 900 and may include functional blocks, which are heat-emitting components. Referring to the left side of FIG. 23B, the chip 900 may include IP1, IP2, and IP3, memory MEM, and media 910, 920, 930, and 940 between the IP1, the IP2, and the IP3 and the memory MEM. The IP1, the IP2, and the IP3 may each be a processor, a digital block for performing a certain process, an analog block for processing an analog signal, or the like. The memory MEM may be volatile memory such as Dynamic Random Access Memory (DRAM) or Static Random Access Memory (SRAM), or may be non-volatile memory such as flash memory. Among the media 910, 920, 930, and 940, the media 910, 920, and 930 may have a variable thermal resistance and/or thermal capacity, and the medium 940 may have a fixed thermal resistance and/or thermal capacity. When the media 910, 920, and 930 have a thermal resistance and/or thermal capacity that vary according to an external signal applied thereto, a controller for controlling the thermal resistance and/or thermal capacity of the media 910, 920, and 930 may be included in the chip 900 or in a chip (e.g., a power management integrated circuit (PMIC)) different from the chip 900.

Referring to the right side of FIG. 23B, the chip 900 may be considered as corresponding to the chip 900' including the IP1, the IP2, and the IP3 and the memory MEM. The IP1, the IP2, and the IP3 and the memory MEM may each have a temperature limit, and the media 910, 930, and 940 may be respectively modeled as variable devices 991, 993, and 994. Medium 920 may be modeled as fixed device 992.

Referring to FIG. 23C, the apparatus 1000 may be an electronic device including a battery 1020, which is a heat-emitting component. Referring to the left side of FIG. 23C, the apparatus 1000 may include the battery 1020 and a chip 1030, which are heat-emitting components. For example, the chip 1030 may consume power and thus may generate heat, and the battery 1020 may generate heat when being charged or discharged. Also, a front case 1010 and a rear case 1040 which are exposed to the outside of the apparatus 1000 may each have a temperature limit.

Referring to the right side of FIG. 23C, the apparatus 1000 may be considered as corresponding to the 1000' including a front case 1010', a battery 1020', a chip 1030', a rear case 1040', and devices 1091', 1092', 1093', and 1094'. At least one of the devices 1091', 1092', 1093', and 1094' may have a variable thermal resistance and/or thermal capacity. When at least one of the devices 1091', 1092', 1093', and 1094' has a thermal resistance and/or thermal capacity that varies according to an external signal applied thereto, a controller for controlling the thermal resistance and/or thermal capacity may be included in the chip 1030 or a chip (e.g., a PMIC) different from the chip 1030.

While some example embodiments have been particularly shown and described, it will be understood that various changes in form and details may be made therein without departing from the spirit and scope of the following claims.

What is claimed is:

1. A controller configured to:
   acquire a first temperature of a first component and a second temperature of a second component, the first component configured to emit heat;
   estimate a first thermal margin of the first component based on a first temperature limit of the first component and the first temperature;

estimate a second thermal margin of the second component based on a second temperature limit of the second component and the second temperature; and adjust a thermal resistance of a medium between the first component and the second component based on the first thermal margin, the second thermal margin, a first reference value of the first thermal margin, and a second reference value of the second thermal margin including at least one of decreasing the thermal resistance of the medium based on the first thermal margin being less than the first reference value and the second thermal margin being equal to or greater than the second reference value, or increasing the resistance of the medium based on the first thermal margin being equal to or greater than the first reference value and the second thermal margin being less than the second reference value.

2. The controller of claim 1, wherein
the controller is further configured to,
estimate a temperature increase rate of the first component, and
adjust the thermal resistance based on the temperature increase rate, the first thermal margin and the second thermal margin.

3. The controller of claim 2, wherein the controller is further configured to estimate the temperature increase rate based on at least one of the first temperature or an energy consumption amount of the first component.

4. The controller of claim 3, wherein the controller is further configured to determine an amount of power consumed by the first component and estimate the temperature increase rate based on the amount of power.

5. The controller of claim 2, wherein the controller is further configured to:
adjust the thermal resistance by maintaining or increasing the thermal resistance of the medium based on the temperature increase rate being less than a first reference value of the temperature increase rate; and
adjust the thermal resistance by maintaining or decreasing the thermal resistance of the medium based on the temperature increase rate being greater than a second reference value of the temperature increase rate.

6. The controller of claim 1, wherein the controller includes a memory configured to store the first temperature limit and the second temperature limit.

7. The controller of claim 1, wherein the controller is further configured to adjust the thermal resistance such that a difference between a first point in time when the first temperature reaches the first temperature limit and a second point in time when the second temperature reaches the second temperature limit is decreased.

8. A controller configured to:
acquire a first temperature of a first component and a second temperature of a second component, the second component being thermally coupled to the first component and having a variable thermal capacity; and
adjust the variable thermal capacity of the second component based on the first temperature, the second temperature, a first temperature limit of the first component, and a second temperature limit of the second component,
wherein the controller is further configured to:
estimate a temperature increase rate of the first component; and adjust the variable thermal capacity based on the temperature increase rate, the first temperature, the second temperature, the first temperature limit, and the second temperature limit.

9. The controller of claim 8, wherein
the second component includes at least one cell and at least one medium between the first component and the at least one cell, the at least one medium having a variable thermal resistance; and
the controller is further configured to adjust the variable thermal capacity by controlling the at least one medium.

10. The controller of claim 8, wherein
the first component is thermally coupled to the second component via a medium between the first component and the second component, the medium having a variable thermal resistance; and
the controller is further configured to adjust the variable thermal resistance of the medium based on the first temperature, the second temperature, the first temperature limit, and the second temperature limit.

11. The controller of claim 8, wherein
the second component includes a plurality of cells, each of the plurality of cells having a different thermal capacity; and
the controller is configured to adjust the variable thermal capacity of the second component by controlling thermal coupling of the plurality of cells with the first component.

12. An apparatus, comprising:
a first component having a first temperature limit;
a second component having a second temperature limit;
a first medium between the first component and the second component, a thermal capacity of the second component being adjustable; and
a controller configured to,
estimate a first thermal margin of the first component based on the first temperature limit and a first temperature of the first component, and
estimate a second thermal margin of the second component based on the second temperature limit and a second temperature of the second component, and
adjust the thermal capacity of the second component based on the first thermal margin, the second thermal margin, a first reference value of the first thermal margin and a second reference value of the second thermal margin.

13. The apparatus of claim 12, wherein the controller is further configured to adjust the thermal capacity of the second component such that a difference between a first point in time when a first temperature of the first component reaches the first temperature limit and a second point in time when a second temperature of the second component reaches the second temperature limit decreases.

14. The apparatus of claim 12, wherein the controller is further configured to adjust the thermal capacity of the second component to at least one of: (i) decrease a difference between a first point in time when a first temperature of the first component reaches the first temperature limit and a second point in time when a second temperature of the second component reaches the second temperature limit, or (ii) delay an earlier of the first point in time and the second point in time.

15. The controller of claim 12, wherein the controller is further configured to adjust the thermal capacity of the second component including:

increasing the thermal capacity of the second component based on the first thermal margin being less than a first reference value and the second thermal margin being equal to or greater than a second reference value; or decreasing the thermal capacity of the second component based on the first thermal margin being equal to or greater than the first reference value and the second thermal margin being less than the second reference value.

16. The controller of claim 15, wherein the controller is further configured to adjust a thermal resistance of the first medium and the thermal capacity of the second component including:

decreasing the thermal resistance of the first medium and increasing the thermal capacity of the second component based on the first thermal margin being less than the first reference value and the second thermal margin being equal to or greater than the second reference value.

* * * * *